US009709105B2

(12) United States Patent
Ookuma et al.

(10) Patent No.: US 9,709,105 B2
(45) Date of Patent: Jul. 18, 2017

(54) CLUTCH MECHANISM

(71) Applicant: DENSO CORPORATION, Kariya, Aichi-pref. (JP)

(72) Inventors: Tooru Ookuma, Anjo (JP); Motohiko Ueda, Okazaki (JP); Yuichiro Okuda, Toyohashi (JP); Yousuke Yamagami, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 123 days.

(21) Appl. No.: 14/780,396

(22) PCT Filed: Mar. 19, 2014

(86) PCT No.: PCT/JP2014/001565
§ 371 (c)(1),
(2) Date: Sep. 25, 2015

(87) PCT Pub. No.: WO2014/156062
PCT Pub. Date: Oct. 2, 2014

(65) Prior Publication Data
US 2016/0053828 A1    Feb. 25, 2016

(30) Foreign Application Priority Data
Mar. 29, 2013   (JP) ................ 2013-073056

(51) Int. Cl.
*F16D 27/01*    (2006.01)
*F16D 27/112*   (2006.01)
(Continued)

(52) U.S. Cl.
CPC ......... *F16D 48/064* (2013.01); *F16D 27/004* (2013.01); *F16D 27/112* (2013.01);
(Continued)

(58) Field of Classification Search
CPC ................ F16D 27/004; F16D 27/112; F16D 2027/002; F16D 48/064; F16D 2500/1022;
(Continued)

(56) References Cited

U.S. PATENT DOCUMENTS

| | | | |
|---|---|---|---|
| 5,827,148 | A | 10/1998 | Seto et al. |
| 2005/0279607 | A1 | 12/2005 | Fusegi |

(Continued)

FOREIGN PATENT DOCUMENTS

| | | |
|---|---|---|
| JP | H09196128 A | 7/1997 |
| JP | 2006029579 A | 2/2006 |
| JP | 2011080579 A | 4/2011 |

OTHER PUBLICATIONS

International Search Report and Written Opinion (in Japanese with English Translation) for PCT/JP2014/001565, mailed Jun. 17, 2014; ISA/JP.

*Primary Examiner* — Richard Lorence
(74) *Attorney, Agent, or Firm* — Harness, Dickey & Pierce, P.L.C.

(57) ABSTRACT

When a clutch relay connects between a control device and a vehicle electric power source in response to outputting of a clutch OFF signal from an electronic control device to the clutch relay, a timer circuit starts a control operation for energizing coil portions. When a predetermined time period elapses, the timer circuit terminates energization of the coil portions. When the clutch relay connects between the control device and the vehicle electric power source in response to outputting of a clutch ON signal from the electronic control device to the relay, the timer circuit starts a control operation for energizing the coil portions. When a predetermined time period elapses, the timer circuit terminates energization of the coil portions.

8 Claims, 11 Drawing Sheets

(51) Int. Cl.
    *F16D 48/06*     (2006.01)
    *F16D 27/00*     (2006.01)

(52) U.S. Cl.
    CPC .......... *F16D 2027/002* (2013.01); *F16D 2500/1022* (2013.01); *F16D 2500/3026* (2013.01); *F16D 2500/3166* (2013.01); *F16D 2500/501* (2013.01); *F16D 2500/70418* (2013.01); *F16D 2500/70424* (2013.01)

(58) Field of Classification Search
    CPC ..... F16D 2500/3026; F16D 2500/3166; F16D 2500/501; F16D 2500/5012; F16D 2500/70418; F16D 2500/70424
    USPC ............................... 192/84.2, 84.31
    See application file for complete search history.

(56) References Cited

U.S. PATENT DOCUMENTS

| | | |
|---|---|---|
| 2011/0083935 A1 | 4/2011 | Katano et al. |
| 2015/0292574 A1* | 10/2015 | Ookuma ............... F16D 13/76 192/84.31 |
| 2015/0300424 A1* | 10/2015 | Ueda ................. F16D 27/004 192/84.31 |

* cited by examiner

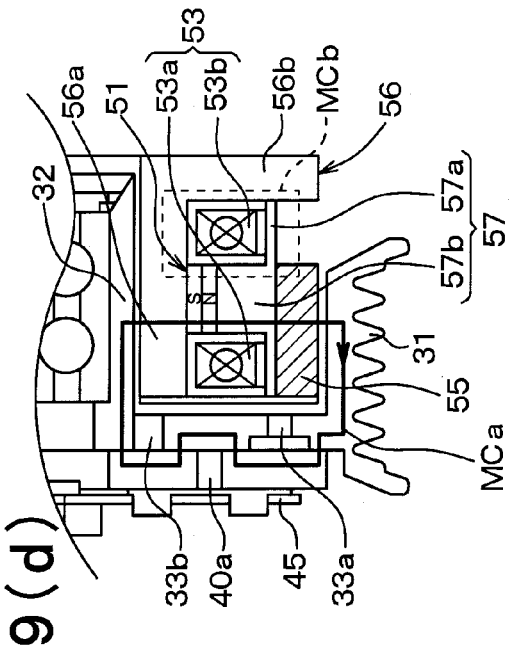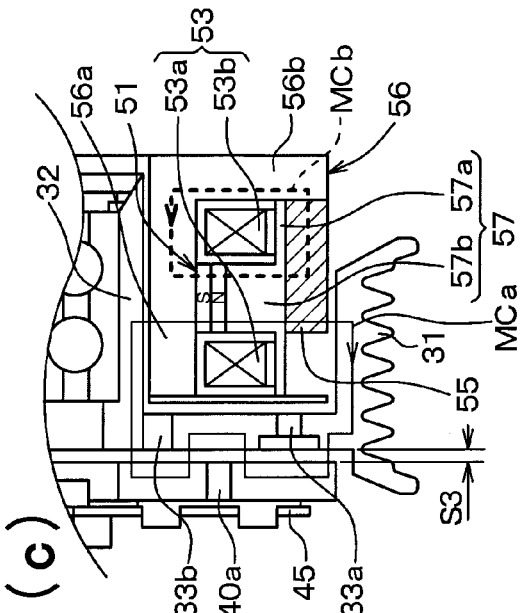
FIG. 9(a)  FIG. 9(b)  FIG. 9(c)  FIG. 9(d)

CLUTCH MECHANISM

CROSS REFERENCE TO RELATED APPLICATIONS

This application is a U.S. National Phase Application under 35 U.S.C. 371 of International Application No. PCT/JP2014/001565 filed on Mar. 19, 2014 and published in Japanese as WO 2014/156062 A1 on Oct. 2, 2014. This application is based on and claims the benefit of priority from Japanese Patent Application No. 2013-73056 filed on Mar. 29, 2013. The entire disclosures of all of the above applications are incorporated herein by reference.

TECHNICAL FIELD

The present disclosure relates to a clutch mechanism.

BACKGROUND ART

An electromagnetic clutch mechanism, which enables or disables conduction of a rotational drive force from a driving-side rotatable body to a driven-side rotatable body through energization or deenergization of an electromagnetic coil, is known. In this type of clutch mechanism, when the electromagnetic coil is energized, the driving-side rotatable body and the driven-side rotatable body are coupled with each other to conduct the rotational drive force from the driving-side rotatable body to the driven-side rotatable body. When the electromagnetic coil is deenergized, the driving-side rotatable body and the driven-side rotatable body are decoupled from each other to disable the conduction of the rotational drive force from the driving-side rotatable body to the driven-side rotatable body.

However, in this type of electromagnetic clutch mechanism, at the time of coupling between the driving-side rotatable body and the driven-side rotatable body to conduct the rotational drive force, the electromagnetic coil must be always energized throughout the time period of coupling between the driving-side rotatable body and the driven-side rotatable body. Thereby, the electric power consumption (the energy consumption) is disadvantageously increased.

In view of the above disadvantage, the Patent Literature 1 proposes a self-holding type clutch mechanism, in which a permanent magnet is used to eliminate a need for energizing the electromagnetic coil at the time other than the time of coupling between the driving-side rotatable body and the driven-side rotatable body and the time of decoupling between the driving-side rotatable body and the driven-side rotatable body to reduce the electric power consumption.

This self-holding type clutch mechanism includes an electromagnetic coil, a permanent magnet, and a movable member. The electromagnetic coil includes first and second coil portions, which are respectively configured into a ring form centered at a rotational axis of the compressor and are arranged one after another in the axial direction of the rotational axis. The permanent magnet is configured into a hollow cylindrical form and is held between the first coil portion and the second coil portion. The movable member is configured into a ring form centered at the rotational axis and is movable in the axial direction.

In the clutch mechanism, the movable member is placed on an outer side of the first and second coil portions and the permanent magnet in a radial direction of the rotational axis. The permanent magnet generates an attracting magnetic circuit and a non-attracting magnetic circuit. The attracting magnetic circuit generates a magnetic attractive force that couples between the driving-side rotatable body and the driven-side rotatable body. The non-attracting magnetic circuit does not generate the magnetic attractive force. A resilient member is provided to exert a resilient force, which decouples between the driving-side rotatable body and the driven-side rotatable body.

For example, an electric current is conducted through the first and second coils in a first direction. In this way, a magnetic force, which is generated from the attracting magnetic circuit by the electromagnetic force generated from the first coil portion, becomes small, and a magnetic force, which is generated from the non-attracting magnetic circuit by the electromagnetic force generated from the second coil portion, becomes large.

In response to this, the magnetic force, which is generated from the non-attracting magnetic circuit, becomes larger than the magnetic force, which is generated from the attracting magnetic circuit. At this time, the movable member is moved toward one side in the axial direction by the magnetic force generated from the non-attracting magnetic circuit. Thereby, the resilient force of the resilient member becomes larger than the magnetic attractive force generated from the attracting magnetic circuit, so that the driving-side rotatable body and the driven-side rotatable body are decoupled from each other by the resilient force of the resilient member. That is, the clutch mechanism is placed into the OFF state.

In contrast, the electric current is conducted through the first and second coil portions in a second direction that is different from the first direction. In this way, a magnetic force, which is generated from the attracting magnetic circuit by the electromagnetic force generated from the first coil portion, becomes large, and a magnetic force, which is generated from the non-attracting magnetic circuit by the electromagnetic force generated from the second coil portion, becomes small.

In response to this, the magnetic force, which is generated from the attracting magnetic circuit, becomes larger than the magnetic force, which is generated from the non-attracting magnetic circuit. At this time, the movable member is moved toward the other side in the axial direction by the magnetic force generated from the attracting magnetic circuit. In this way, the magnetic force, which is generated from the attracting magnetic circuit, becomes larger than the resilient force of the resilient member, so that the driving-side rotatable body and the driven-side rotatable body are coupled with each other. That is, the clutch mechanism is placed into the ON state.

As discussed above, the movable member is moved to the one axial end side or the other axial end side by conducting the electric current through the first and second coil portions in the first direction or the second direction to turn on or off the clutch mechanism.

In the self-holding type clutch mechanism described above, the driven-side rotatable body is attracted and is coupled to the driving-side rotatable body at the time of changing from the OFF state to the ON state.

The driven-side rotatable body is magnetically attracted by the electromagnetic force of the electromagnetic coil and the magnetic force of the permanent magnet. Here, the driven-side rotatable body is magnetically attracted by the electromagnetic force of the electromagnetic coil and the magnetic force of the permanent magnet. Therefore, when the electromagnetic coil is energized upon the holding of the position of the movable member with the permanent magnet after completion of the coupling of the driven-side rotatable body, the excess electric power consumption and the excess heat generation of the electromagnetic coil may disadvantageously occur.

The excess heat generation of the electromagnetic coil may result in the temperature increase of the permanent magnet, which is placed adjacent to the electromagnetic coil, to cause a deterioration in the performance of the permanent magnetic and thereby to possibly result in a deterioration of the torque transmission performance of the clutch.

Furthermore, when the energization of the electromagnetic coil is terminated before the completion of the coupling of the driven-side rotatable body and the movement of the movable member, an erroneous operational state, such as an unachievable ON state of the clutch mechanism, may occur, or slipping may occur at coupling surfaces between the driven-side rotatable body and the driving-side rotatable body due to shortage of the magnetic attractive force to cause a deterioration in an NV (Noise and Vibration) performance.

Also, when the termination of the energization of the electromagnetic coil before the completion of the coupling of the driven-side rotatable body and the movement of the movable member is repeated, the coupling surfaces may be abnormally worn to cause an increase in a size of a gap between the driven-side rotatable body and the driving-side rotatable body at the clutch OFF time to cause a deterioration in the clutch operability and thereby to result in the unachievable ON state of the clutch.

At the time of changing the operational state of the clutch from the ON state to the OFF state, when the electromagnetic coil is energized upon the holding of the position of the movable member with the permanent magnet after completion of the decoupling of the driven-side rotatable body from the driving-side rotatable body and the movement of the movable body, the excessive electric power consumption and the excessive heat generation of the electromagnetic coil occur.

In view of the above matter, it is understood that an appropriate determination must be made for termination of the energization of the electromagnetic coil in order to reliably operate the clutch mechanism and to implement the clutch performance throughout the required product lifetime.

CITATION LIST

Patent Literature

PATENT LITERATURE 1: JP2011-80579A (corresponding to US2011/0083935A1)

SUMMARY OF INVENTION

The present disclosure is made in view of the above matter, and it is an objective of the present disclosure to provide a clutch mechanism that can achieve a reliable clutch operation with relatively small electric power consumption by making an appropriate determination for termination of energization of an electromagnetic coil.

In order to achieve the above objective, according to the present disclosure, there is provided a clutch mechanism that includes a driving-side rotatable body, a driven-side rotatable body, a permanent magnet, a movable member, an electromagnetic coil, a first energization control arrangement, a second energization control arrangement, a determining arrangement, and an energization terminating arrangement. The driving-side rotatable body is rotated by a rotational drive force, which is outputted from a drive source. The rotational drive force is transmitted from the driving-side rotatable body to the driven-side rotatable body through coupling of the driven-side rotatable body to the driving-side rotatable body. The permanent magnet generates an attracting magnetic circuit, which generates a magnetic force for coupling between the driving-side rotatable body and the driven-side rotatable body, and a non-attracting magnetic circuit, which is different from the attracting magnetic circuit. The movable member is made of a magnetic material and is displaceable. The electromagnetic coil generates an electromagnetic force for displacing the movable member. When the driving-side rotatable body and the driven-side rotatable body are coupled with each other, the movable member is placed in a first position, at which a magnetic resistance of the attracting magnetic circuit is reduced in comparison to a magnetic resistance of the attracting magnetic circuit at a time of decoupling between the driving-side rotatable body and the driven-side rotatable body. When the driving-side rotatable body and the driven-side rotatable body are decoupled from each other, the movable member is placed in a second position, at which a magnetic resistance of the non-attracting magnetic circuit is reduced in comparison to a magnetic resistance of the non-attracting magnetic circuit at a time of coupling between the driving-side rotatable body and the driven-side rotatable body. The first energization control arrangement executes energization of the electromagnetic coil in such a manner that a magnetic force, which is generated from the non-attracting magnetic circuit, becomes larger than the magnetic force, which is generated from the attracting magnetic circuit, and thereby the movable member is displaced from the first position to the second position. The second energization control arrangement executes energization of the electromagnetic coil in such a manner that the magnetic force, which is generated from the non-attracting magnetic circuit, becomes smaller than the magnetic force, which is generated from the attracting magnetic circuit, and thereby the movable member is displaced from the second position to the first position. The determining arrangement determines whether the movable member has reached one of the first position and the second position. The energization terminating arrangement stops the energization of the electromagnetic coil when the determining arrangement determines that the movable member has reached the one of the first position and the second position.

BRIEF DESCRIPTION OF DRAWINGS

FIG. 8 is a flowchart showing another control process of the timer circuit of

FIG. 6.

FIGS. 9(a) to 9(d) are diagrams showing an operation of the clutch mechanism according to the first embodiment.

DESCRIPTION OF EMBODIMENTS

Figure 1A:
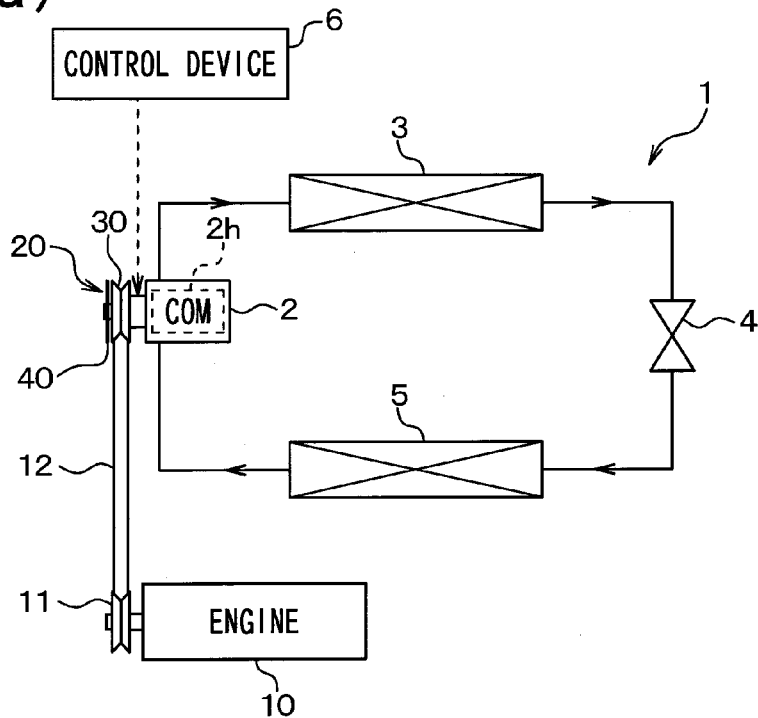
FIG. 1(a) is a schematic view showing an entire structure of a refrigeration cycle system, in which a clutch mechanism of a first embodiment of the present disclosure is applied.

Various embodiments of the present disclosure will be described with reference to the accompanying drawings. In each of the following embodiments, the same or equivalent portions are indicated by the same reference numerals in the drawing(s) for the sake of simplifying the description.

First Embodiment

Figure 1B:
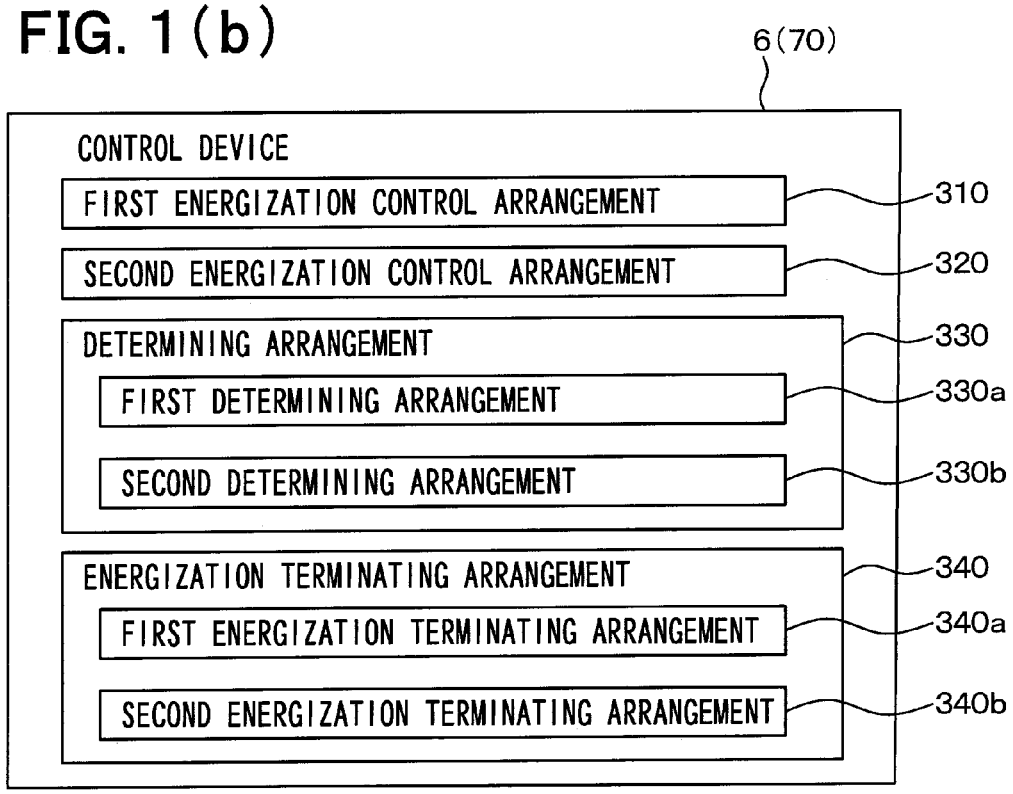
FIG. 1(b) is a functional block diagram showing functions of respective circuit arrangements of a control device of FIG. 1(a).

FIG. 1(a) is a schematic view showing an entire structure of a refrigeration cycle system 1 of a vehicle air conditioning system, in which a clutch mechanism 20 of the present embodiment is applied. FIG. 1(b) is a functional block diagram showing functions of respective circuit arrangements of a control device of FIG. 1(a).

The refrigeration cycle system 1 is a system, in which a compressor 2, a radiator 3, an expansion valve 4, and an evaporator 5 are connected one after another. The compressor 2 draws and compresses refrigerant. The radiator 3 radiates the heat from the discharged refrigerant, which is discharged from the compressor 2. The expansion valve 4 decompresses and expands the refrigerant outputted from the radiator 3. The evaporator 5 evaporates the refrigerant, which has been depressurized through the expansion valve 4, so that the refrigerant absorbs the heat at the evaporator 5.

The compressor 2 is installed in an engine room of a vehicle. In the compressor 2, a compression mechanism 2h is driven by a rotational drive force applied from an engine 10 (serving as a vehicle drive source) through the clutch mechanism 20, so that the compression mechanism 2h draws and compresses the refrigerant outputted from the evaporator 5.

The compression mechanism 2h may be a fixed displacement compression mechanism, in which a pumping capacity is fixed, or a variable displacement compression mechanism, in which a pumping capacity is adjustable based on a control signal received from an outside.

The clutch mechanism 20 of the present embodiment is a clutch mechanism that has a pulley integrated therein and is connected to the compressor 2. The clutch mechanism 20 transmits a rotational drive force of the engine 10, which is applied to the clutch mechanism 20 from an engine side pulley 11 through a V-belt 12, to the compressor 2. The engine side pulley 11 is connected to a rotational drive shaft of the engine 10.

The clutch mechanism 20 includes a pulley 30 and an armature 40. The pulley 30 serves as a driving-side rotatable body that is rotated by a rotational drive force, which is applied to the driving-side rotatable body from the engine 10 through the V-belt 12. The armature 40 serves as a driven-side rotatable body that is connected to a rotatable shaft 2a of the compressor 2. The clutch mechanism 20 enables and disables conduction of the rotational drive force from the engine 10 to the compressor 2 by coupling or decoupling between the pulley 30 and the armature 40.

That is, when the pulley 30 and the armature 40 are coupled with each other in the clutch mechanism 20, the rotational drive force of the engine 10 is conducted to the compressor 2 to drive the refrigeration cycle system 1. In contrast, when the pulley 30 and the armature 40 are decoupled from each other in the clutch mechanism 20, the rotational drive force of the engine 10 is not conducted to the compressor 2, and thereby the refrigeration cycle system 1 is not operated.

Next, the details of the structure of the clutch mechanism 20 of the present embodiment will be described with reference to FIGS. 2, 3 and 4.

Figure 2:
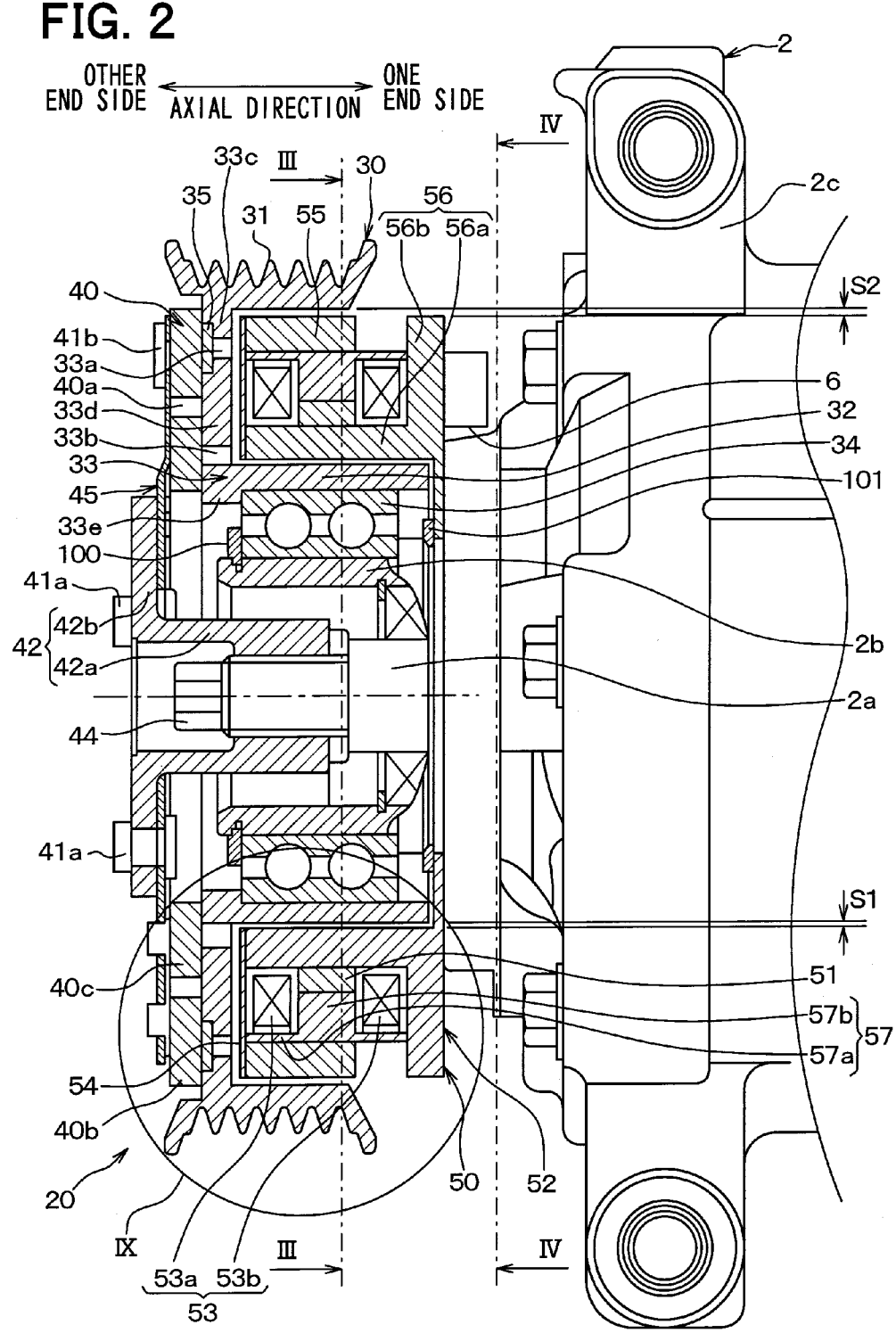
FIG. 2 is a cross-sectional view showing a cross section of the clutch mechanism of the first embodiment.
Figure 3:
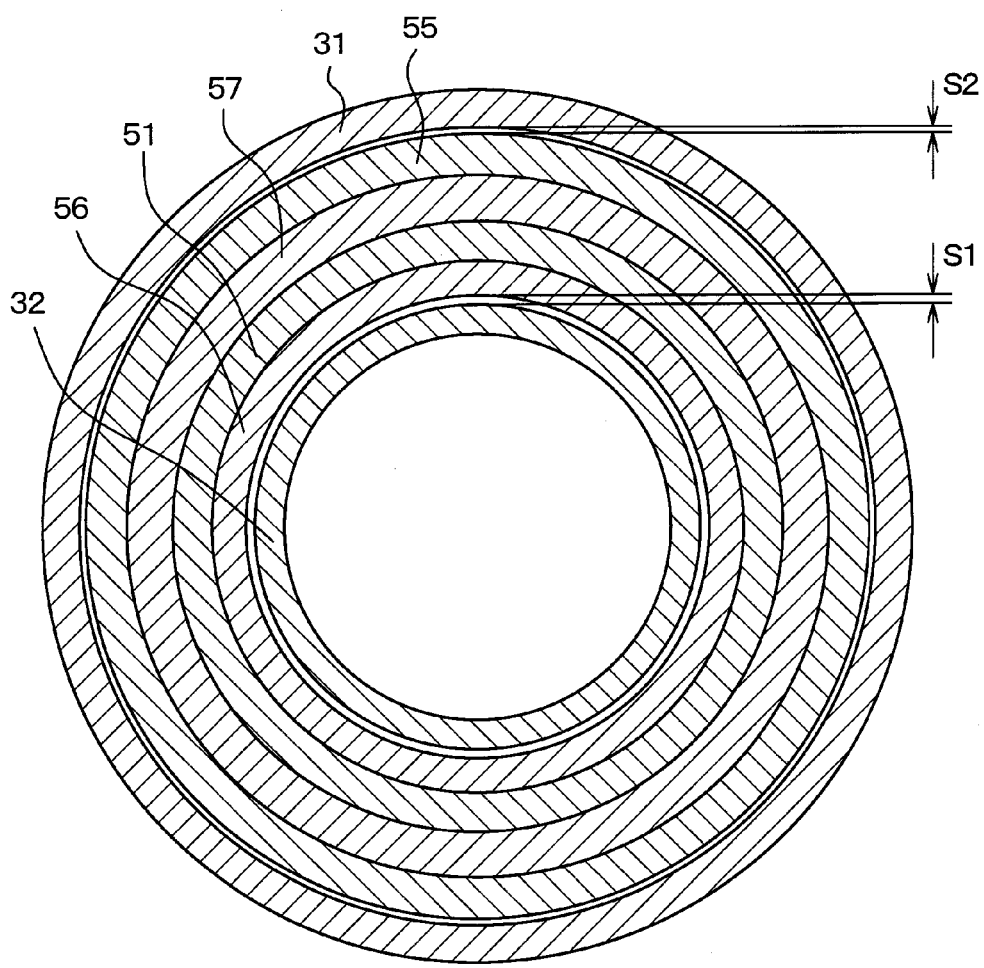
FIG. 3 is a cross-sectional view taken along line III-III in FIG. 2.

FIG. 2 is an axial cross-sectional view of the clutch mechanism 20. This axial cross-sectional view is a cross-sectional view of the clutch mechanism 20, which includes an axis of the rotatable shaft 2a of the compressor 2 and is taken along the axis of the rotatable shaft 2a of the compressor 2. FIG. 3 is a cross-sectional view taken along line III-III in FIG. 2. FIG. 2 shows a state, in which the pulley 30 and the armature 40 are coupled with each other. FIG. 4 is a cross-sectional view taken along line IV-IV in FIG. 2.

As shown in FIG. 2, the clutch mechanism 20 includes a stator 50 besides the pulley 30 and the armature 40.

The pulley 30 includes an outer cylindrical tubular portion 31, an inner cylindrical tubular portion 32 and an end surface portion 33.

The outer cylindrical tubular portion 31 is configured into a cylindrical tubular form that has a central axis, which coincides with the axis (a dot-dash line in FIG. 2) of the rotatable shaft 2a. V-shaped grooves (specifically, poly-V-groove) are formed at an outer peripheral part of the outer cylindrical tubular portion 31 to receive the V-belt 12.

An outer race of a ball bearing 34 is fixed to an inner peripheral part of the inner cylindrical tubular portion 32. The ball bearing 34 rotatably fixes the pulley 30 relative to a housing 2c, which forms an outer shell of the compressor 2, such that the pulley 30 is rotatable about the axis of the rotatable shaft 2a of the compressor 2, which serves as the central axis. Therefore, an inner race of the ball bearing 34 is fixed to the housing 2c of the compressor 2 through a fixing member, such as a snap ring 100. The inner race of the ball bearing 34 is placed on a radially outer side of a housing boss portion 2b formed in the housing 2c of the compressor 2. The housing boss portion 2b is configured into a cylindrical tubular form that has a central axis, which coincides with the axis of the rotatable shaft 2a of the compressor 2.

The inner cylindrical tubular portion 32 is placed on a radially inner side of the outer cylindrical tubular portion 31 and is configured into a cylindrical tubular form that has an axis, which coincides with the axis of the rotatable shaft 2a of the compressor 2.

The outer cylindrical tubular portion 31 and the inner cylindrical tubular portion 32 of the present embodiment are both made of a magnetic material (e.g., iron) and form a part of an attracting magnetic circuit MCa (see FIGS. 9(a)-9(d)), which will be described later.

The end surface portion 33 extends in a direction (a radial direction), which is perpendicular the rotational axis and connects between an axial end of the outer cylindrical tubular portion 31 and an axial end of the inner cylindrical tubular portion 32. Furthermore, a circular through-hole is formed in a center part of the end surface portion 33 to extend between a front side and a back side of the end surface portion 33.

Specifically, the end surface portion 33 includes ring members 33c, 33d, 33e, which are made of a magnetic material (e.g., iron). Each of the ring members 33c, 33d, 33e is configured into a ring form that is centered at the axis of the rotatable shaft 2a. The ring members 33c, 33d, 33e are offset from each other in the radial direction. The ring member 33c is placed on a radially outer side of the ring member 33d. The ring member 33d is placed on a radially outer side of the ring member 33e.

A non-magnetic portion 33a is formed between the ring member 33c and the ring member 33d. The non-magnetic portion 33a is made of a non-magnetic metal material and is configured into a ring form that is centered at the axis of the rotatable shaft 2a.

A non-magnetic portion 33b is formed between the ring member 33d and the ring member 33e. The non-magnetic portion 33b is made of a non-magnetic metal material and is configured into a ring form that is centered at the axis of the rotatable shaft 2a.

In the present embodiment, the outer cylindrical tubular portion 31, the inner cylindrical tubular portion 32, and the end surface portion 33 are integrally formed. Therefore, the ring member 33e is connected to the inner cylindrical tubular portion 32. The ring member 33c is connected to the outer cylindrical tubular portion 31.

The other end side surface of the end surface portion 33 forms a frictional surface that contacts the armature 40 at the time of coupling between the pulley 30 and the armature 40. Therefore, in the present embodiment, a friction member 35, which increases a coefficient of friction of the end surface portion 33, is placed at the other end side of the end surface portion 33. The friction member 35 is made of a non-magnetic material. Specifically, the non-magnetic material of the friction member 35 may be a material that is formed by solidifying alumina with resin, or a sintered material of metal powder (e.g., aluminum powder).

The armature 40 is a circular disk member that extends in the direction perpendicular to the rotatable shaft 2a and has a through-hole, which is formed in a center part of the circular disk member and extends between a front side and a back side of the circular disk member. The armature 40 forms a part of the attracting magnetic circuit MCa, as described later. The rotational center of the armature 40 of the present embodiment coincides with the central axis of the rotatable shaft 2a.

Specifically, the armature 40 includes ring members 40b, 40c, which are made of a magnetic material (e.g., iron). Each of the ring members 40b, 40c is configured into a ring form that is centered at the axis of the rotatable shaft 2a. The ring member 40b is placed on a radially outer side of the ring member 40c. A non-magnetic portion 40a is formed between the ring member 40b and the ring member 40c. The non-magnetic portion 40a is made of a non-magnetic metal material and is configured into a ring form that is centered at the axis of the rotatable shaft 2a.

The non-magnetic portion 40a of the armature 40 is offset in the radial direction from the non-magnetic portions 33a, 33b of the pulley 30.

Furthermore, a planar surface of the armature 40 placed at the one end side of the armature 40 is opposed to the end surface portion 33 of the pulley 30 and forms a friction surface, which contacts the pulley 30 when the pulley 30 and the armature 40 are coupled with each other. A hub 42, which is configured into a generally circular disk form, is placed on the other end side of the armature 40.

The hub 42 forms a connecting member that couples between the armature 40 and the rotatable shaft 2a of the compressor 2. Specifically, the hub 42 includes a cylindrical tubular portion 42a, which extends in a direction of the rotational axis, and a flange portion 42b, which extends from the other end side of the cylindrical tubular portion 42a in the direction perpendicular to the rotational axis.

A leaf spring 45, which extends in the direction perpendicular to the rotational axis, is placed between the hub 42 and the armature 40. The leaf spring 45 is fixed to the flange portion 42b of the hub 42 with rivets 41a.

The leaf spring 45 is fixed to the armature 40 with the rivets 41b. The leaf spring 45 exerts a resilient force to the hub 42 in a direction of moving the armature 40 away from the pulley 30. In a state where the pulley 30 and the armature 40 are spaced from each other, a gap S3 of a predetermined size (see FIGS. 9(b) to 9(c) described later) is formed between the armature 40, which is coupled to the hub 42, and the end surface portion 33 of the pulley 30.

The hub 42 is fixed by tightening and securing the cylindrical tubular portion 42a against the rotatable shaft 2a of the compressor 2 with a bolt 44. The fixation between the hub 42 and the rotatable shaft 2a of the compressor 2 may be implemented by using a fixing means, such as a spline (serration) or a key groove.

The armature 40, the hub 42, the leaf spring 45, and the rotatable shaft 2a of the compressor 2 are fixed in the above described manner. When the pulley 30 and the armature 40 are coupled with each other, the pulley 30, the armature 40, the hub 42, the leaf spring 45, and the rotatable shaft 2a of the compressor 2 are rotated about the central axis that coincides with the central axis of the rotatable shaft 2a of the compressor 2.

The stator 50 is a stator assembly that includes a permanent magnet 51, an electromagnetic coil 53, a stopper portion 54, a movable member 55, a stator housing 56, and a yoke 57.

The permanent magnet 51 is configured into a ring form that is centered at the axis of the rotatable shaft 2a of the compressor 2. A radially outer side of the permanent magnet 51 forms an N-pole, and a radially inner side of the permanent magnet 51 forms an S-pole. The permanent magnet 51 generates the attracting magnetic circuit MCa and a non-attracting magnetic circuit Mcb, as described later.

Neodymium or Samarium cobalt may be used as the permanent magnet 51 of the present embodiment. The permanent magnet 51, the electromagnetic coil 53, the stopper portion 54, the stator housing 56, and the yoke 57 are fixed together through, for example, fitting or tightening to form a structure 52 that is configured into a ring form.

The electromagnetic coil 53 includes a coil portion 53a and a coil portion 53b. The coil portion 53a and the coil portion 53b are connected in series. The coil portion 53a is configured into a ring form that is centered at the axis of the rotatable shaft 2a of the compressor 2. The coil portion 53b is configured into a ring form that is centered at the axis of the rotatable shaft 2a.

The coil portion 53a is placed on the other end side of the permanent magnet 51 in the axial direction. The coil portion 53b is placed on the one end side of the permanent magnet 51 in the axial direction. That is, the permanent magnet 51 is held between the coil portion 53a and the coil portion 53b.

The coil portions 53a, 53b of the present embodiment are formed by winding a coil wire, which is made of, for example, copper or aluminum, around, for example, a spool made of resin to form a plurality of rows and a plurality of layers of the coil wire.

The movable member 55 is placed on an outer side of the permanent magnet 51 and the electromagnetic coil 53 in the radial direction of the rotatable shaft 2a. Specifically, the movable member 55 is placed on the outer side of the yoke 57 in the radial direction of the rotatable shaft 2a while a clearance is interposed between the movable member 55 and the yoke 57.

The movable member 55 is configured into a cylindrical tubular form that is centered at the axis of the rotatable shaft 2a. The movable member 55 is placed on an inner side of the outer cylindrical tubular portion 31 in the radial direction of the rotatable shaft 2a. A gap S2 is formed between the movable member 55 and the outer cylindrical tubular portion 31. In this way, the movable member 55 is movable relative to the yoke 57 in the axial direction (a thrust direction) of the rotatable shaft 2a. The movable member 55 of the present embodiment is made of a magnetic material (e.g., iron).

Here, an entire length of the movable member 55, which is measured in the direction of the rotational axis, is shorter than an entire length of the structure 52, which is measured in the direction of the rotational axis. Thereby, in a case where the movable member 55 is placed at a position (hereinafter referred to as a first position), which is at the other end side in the axial direction, a gap (air gap) is formed on the one end side of the movable member 55 in the axial direction. The gap increases a magnetic resistance of the non-attracting magnetic circuit MCb that is formed by the permanent magnet 51 on the opposite side of the pulley 30, which is opposite from the end surface portion 33.

In contrast, in a case where the movable member 55 is placed at a position (hereinafter referred to as a second position), which is located at the one end side in the axial direction, a gap is formed on the other end side of the movable member 55 in the axial direction. The gap increases a magnetic resistance of the attracting magnetic circuit MCa that is formed by the permanent magnet 51 on the end surface portion 33 side of the pulley 30.

As described later, the magnetic resistance of the attracting magnetic circuit MCa and the magnetic resistance of the non-attracting magnetic circuit Mcb can be changed through the movement of the movable member 55 in the axial direction discussed above.

A heat treatment (e.g., quenching, tempering) is applied to the movable member 55 of the present embodiment to increase the hardness of the movable member 55 and thereby to limit wearing of the movable member 55 itself. The stopper portion 54 is placed on the other end side of the movable member 55 and the coil portion 53a of the electromagnetic coil 53 in the axial direction. The stopper portion 54 stops the other end side of the movable member 55 in the axial direction through abutment of the movable member 55 against the stopper portion 54.

The stator housing 56 includes a tubular portion 56a and a wall portion 56b. The tubular portion 56a is placed on an inner side of the permanent magnet 51 and the electromagnetic coil 53 in the radial direction of the rotatable shaft 2a. The tubular portion 56a is configured into a cylindrical tubular form that is centered at the central axis of the rotatable shaft 2a. The wall portion 56b is configured into a ring form that extends outward from one end of the tubular portion 56a in the radial direction of the rotatable shaft 2a. The tubular portion 56a and the wall portion 56b are integrally formed from a magnetic material (e.g., iron).

The stator housing 56 of the present embodiment is fixed to the housing 2c of the compressor 2 with a fixing means, such as a snap ring 101. In this way, the structure 52 is fixed to the housing 2c of the compressor 2. A gap S1 is formed between the tubular portion 56a of the stator housing 56 and the inner cylindrical tubular portion 32 of the pulley 30.

The yoke 57 includes a guide portion 57a and an intermediate magnetic portion 57b. The guide portion 57a is configured into a cylindrical tubular form, which is centered at the central axis of the rotatable shaft 2a. An outer peripheral surface of the guide portion 57a is formed smoothly along the axial direction of the rotatable shaft 2a.

A solid lubrication film is formed through a surface treatment process in the outer peripheral surface (i.e., the movable member 55 side surface) of the guide portion 57a. The surface treatment process is a process that forms the solid lubrication film, which ensures a good slidable state between the movable member 55 and the guide portion 57a, and a reduction in a coefficient μ of friction and thereby an improvement in the wearing resistance between the movable member 55 and the guide portion 57a.

The guide portion 57a of the present embodiment guides movement of the movable member 55 in the axial direction, as discussed later.

The intermediate magnetic portion 57b is held between the coil portion 53a and the coil portion 53b. The guide portion 57a and the intermediate magnetic portion 57b are integrally formed from a magnetic material (e.g., iron) and form the attracting magnetic circuit MCa and the non-attracting magnetic circuit MCb, respectively.

Figure 4:
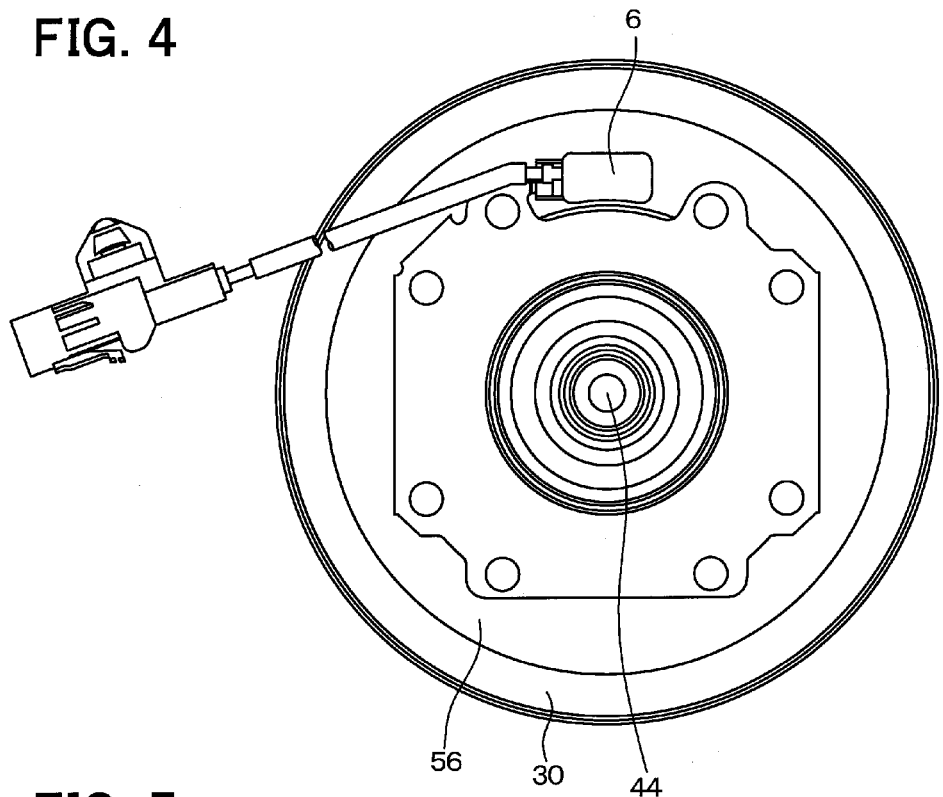
FIG. 4 is a view showing installation of the control device according to the first embodiment.

Furthermore, a control device 6 is placed at the housing 2c side of the wall portion (the stator plate) 56b of the stator housing 56, as shown in FIG. 4. The control device 6 controls the coil portions 53a, 53b based on a control signal outputted from an electronic control device (an ECU in FIG. 5) 70 of the air conditioning system. The electronic control device (the ECU in FIG. 5) 70 of the air conditioning system is placed in an inside of a vehicle cabin. Hereinafter, the electronic control device 70 of the air conditioning system will be simply referred to as the electronic control device (or an on-vehicle electronic control device) 70.

An electric circuit structure of the control device 6 of the present embodiment will be described with reference to FIGS. 5 and 6.

Figure 5:
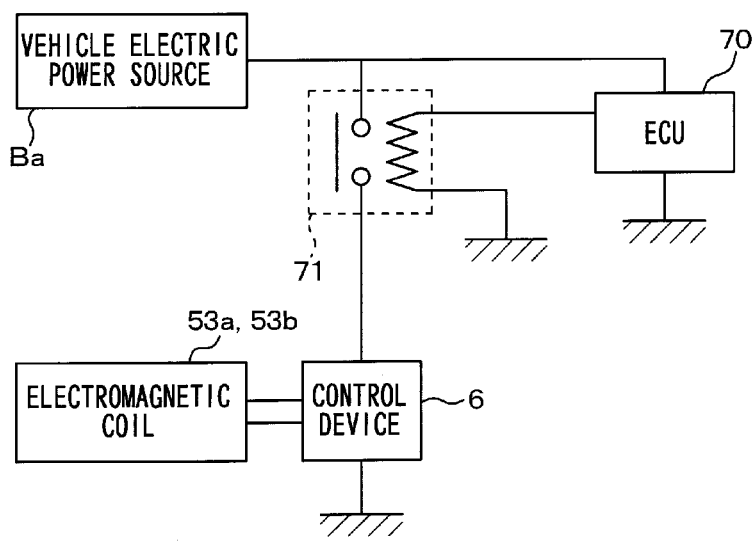
FIG. 5 is a diagram showing an electrical structure of the clutch mechanism of the first embodiment.

The control device 6 of FIG. 5 is connected to an on-vehicle electric power source Ba through a clutch relay 71. The clutch relay 71 is controlled by the electronic control device 70 to open or connect between the control device 6 and the on-vehicle electric power source Ba.

Figure 6:
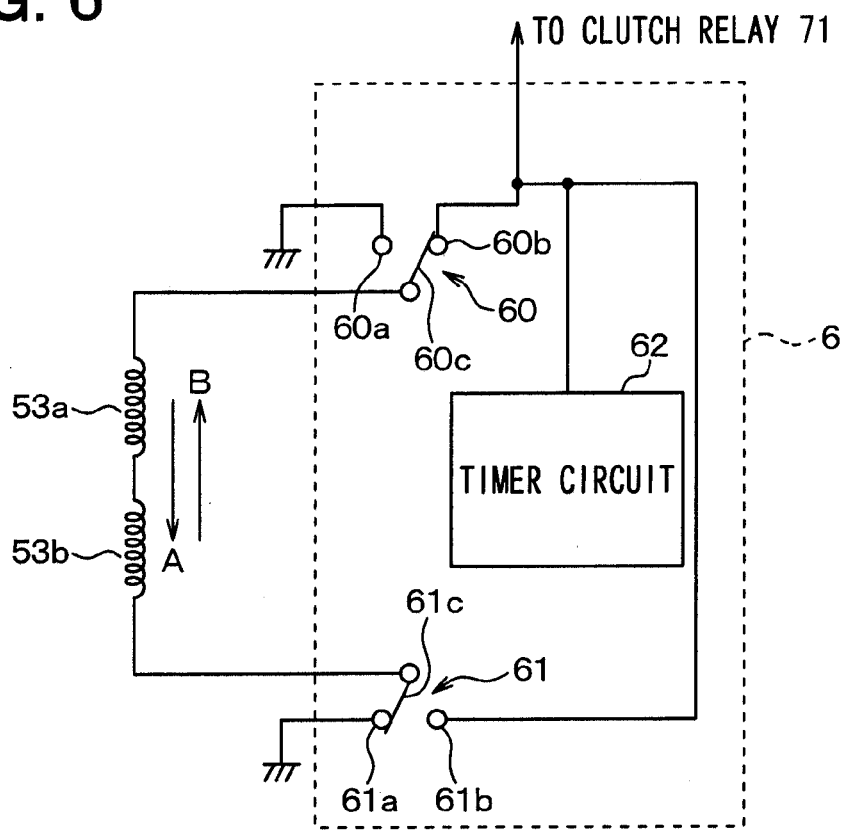
FIG. 6 is an electrical circuit diagram of the control device of FIG. 5.

The control device 6 forms a control circuit of the present disclosure and includes switches 60, 61 and a timer circuit 62, as shown in FIG. 6. The control device 6 of the present embodiment is formed by an integrated circuit.

The switch 60 includes stationary terminals 60a, 60b and a movable terminal 60c. The switch 61 includes stationary terminals 61a, 61b and a movable terminal 61c. The stationary terminal 60a of the switch 60 and the stationary terminal 61a of the switch 61 are connected to a ground. The stationary terminal 60b of the switch 60 and the stationary terminal 61b of the switch 61 are connected to the on-vehicle electric power source Ba through the clutch relay 71.

Figure 7:
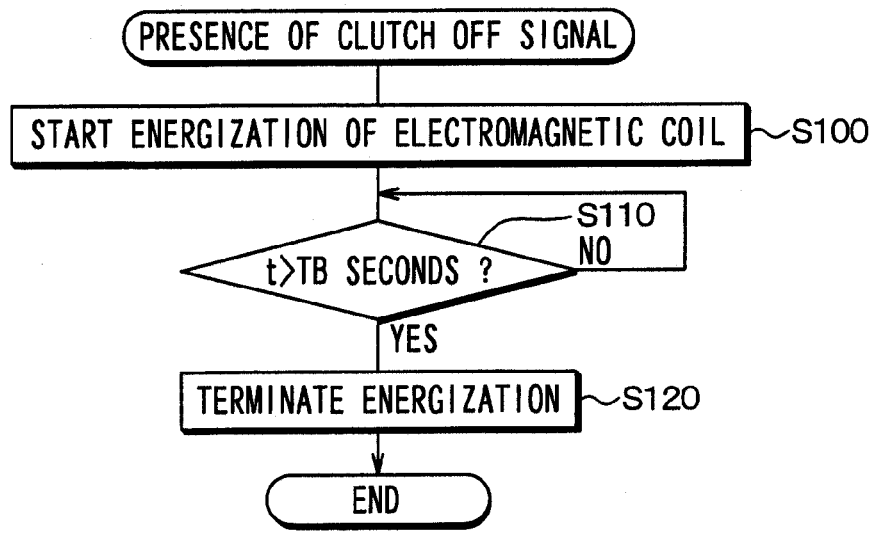
FIG. 7 is a flowchart showing a control process of a timer circuit of FIG. 6.
Figure 8:
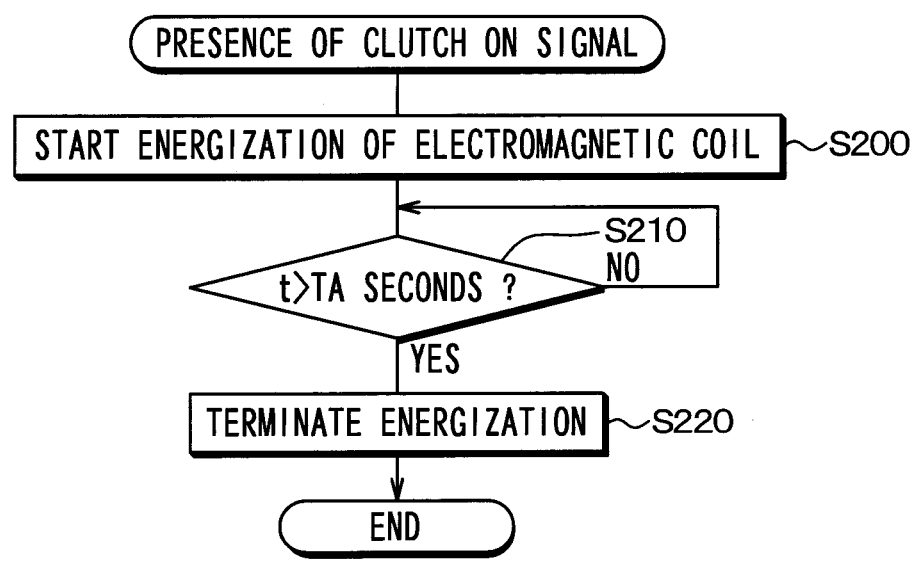

The coil portions 53a, 53b are connected in series between the movable terminal 60c of the switch 60 and the movable terminal 61c of the switch 61. The timer circuit 62 is formed by, for example, a microcomputer and executes a computer program according to flowcharts of FIGS. 7 and 8. FIG. 7 is a flowchart that shows a clutch OFF control process. FIG. 8 is a flowchart that shows a clutch ON control process. The timer circuit 62 executes a clutch ON/OFF control process to control the movable terminals 60c, 61c of the switches 60, 61.

Next, the clutch mechanism 20 of the present embodiment will be described with reference to FIGS. 7, 8, and 9(a) to 9(d). FIGS. 9(a) to 9(d) are descriptive diagrams that use a cross-sectional view of an area IX of FIG. 2. In FIGS. 9(a) to 9(d), hatchings are omitted for the sake of clear indication of the drawings.

First of all, the clutch relay 71 opens between the control device 6 and the on-vehicle electric power source Ba. Thus, the electric current is not conducted through the coil portions 53a, 53b. Then, as shown in FIG. 9(a), in a state where the pulley 30 and the armature 40 are coupled with each other, the movable member 55 is placed in the first position, which is located on the side where the end surface portion 33 of the pulley 30 is placed.

At this time, the magnetic resistance of the attracting magnetic circuit MCa, which is formed by the permanent magnet 51, is reduced in comparison to the case where the movable member 55 is placed in the second position located at the one end side in the axial direction, so that the magnetic force, which is generated by the attracting magnetic circuit MCa, is increased.

Furthermore, the magnetic force, which is generated by the attracting magnetic circuit MCa indicated with a solid bold line in FIG. 9(a), acts as a magnetic attractive force that couples between the pulley 30 and the armature 40.

The attracting magnetic circuit MCa is a magnetic circuit, in which the magnetic flux passes through the yoke 57, the movable member 55, the outer cylindrical tubular portion 31 of the pulley 30, the armature 40, the end surface portion 33, the armature 40, the inner cylindrical tubular portion 32, the tubular portion 56a of the stator housing 56, and the magnet 51 in this order, as indicated with the solid bold line in FIG. 9(a).

The magnetic flux passes through the attracting magnetic circuit MCa of the present embodiment while bypassing the non-magnetic portion 40a of the armature 40 and the non-magnetic portions 33a, 33b of the pulley 30. Therefore, the magnetic flux passes the boundary between the pulley 30 and the armature 40 four times. Thereby, the force, which is larger than the magnetic attractive force described above, can be exerted between the pulley 30 and the armature 40.

Furthermore, in the case where the movable member 55 is placed in the first position at the other end side in the axial direction, the gap is formed between the movable member 55 and the wall portion 56b of the stator housing 56. This gap increases the magnetic resistance of the non-attracting magnetic circuit MCb and reduces the magnetic force, which is generated by the non-attracting magnetic circuit MCb. The non-attracting magnetic circuit MCb is a magnetic circuit that is formed by the permanent magnet 51 and is different from the attracting magnetic circuit MCa.

The non-attracting magnetic circuit MCb is a magnetic circuit, through which the magnetic flux passes the movable member 55, the stator housing 56, the permanent magnet 51, and the yoke 57 in this order, as indicated with a thin dotted line in FIG. 9(a). The magnetic force, which is formed by the non-attracting magnetic circuit MCb, does not function as the attractive force that couples between the pulley 30 and the armature 40.

Furthermore, in the case where the movable member 55 is placed in the first position, the amount of the magnetic flux of the attracting magnetic circuit MCa is increased in comparison to the case where the movable member 55 is placed in the second position at the one end side in the axial direction, so that the movable member 55 is maintained in the first position at the other end side in the axial direction. In the present embodiment, the resilient force of the leaf spring 45 is set to be smaller than the magnetic attractive force generated in the attracting magnetic circuit MCa in the case where the movable member 55 is placed in the first position at the other end side in the axial direction. Therefore, the pulley 30 and the armature 40 are maintained in the state where the pulley 30 and the armature 40 are coupled with each other even though the electric power is not supplied to the electromagnetic coil 53. That is, the rotational drive force is conducted from the engine 10 to the compressor 2.

Next, the electronic control device 70 outputs a clutch OFF signal to the clutch relay 71. Then, the clutch relay 71 connects between the control device 6 and the on-vehicle electric power source Ba. In response to this, the timer circuit 62 receives the electric power from the on-vehicle electric power source Ba and starts the control operation for energizing the coil portions 53a, 53b (step S100 in FIG. 7).

At this time, the movable terminal 60c of the switch 60 contacts the stationary terminal 60b, and the movable terminal 61c of the switch 61 contacts the stationary terminal 61a. Therefore, the electric current flows from the on-vehicle electric power source Ba to the coil portions 53a, 53b in a direction A.

At this time, as shown in FIG. 9(b), the electric current flows in the coil portion 53a from a back side to a front side of the plane of FIG. 9(b), and the electric current flows in the coil portion 53b from the back side to the front side of the plane of FIG. 9(b). Thus, the coil portions 53a, 53b reduce the amount of the magnetic flux, which passes through the attracting magnetic circuit MCa and increases the amount of the magnetic flux, which passes through the non-attracting magnetic circuit MCb.

In this way, the magnetic force, which is generated by the non-attracting magnetic circuit MCb indicated with a bold dotted line in FIG. 9(b), becomes larger than the magnetic attractive force, which is generated by the attracting magnetic circuit MCa indicated with a thin solid line in FIG. 9(b).

In response to this, a drive force, which is generated by the magnetic force of the non-attracting magnetic circuit MCb and drives the movable member 55 toward the one end side in the axial direction, is exerted to the movable member 55. Thus, the movable member 55 is guided by the guide portion 57a of the yoke 57 and is moved from the first position at the other end side in the axial direction toward the second position at the one end side in the axial direction.

Then, when an energization time period of TB seconds (hereinafter referred to a second period or a second predetermined time) has elapsed since the time of starting the energization of the coil portions 53a, 53b (YES at step S110), it is determined that the movable member 55 has reached the second position, which is located on the side where the wall portion 56b is placed. Then, the timer circuit 62 executes a control operation of terminating the energization of the coil portions 53a, 53b by controlling the switches 60, 61 (step S120). At this time, the movable terminal 60c of the switch 60 contacts the stationary terminal 60a instead of the stationary terminal 60b. Therefore, the energization of the coil portions 53a, 53b from the on-vehicle electric power source Ba is terminated.

As shown in FIG. 9(c), in response to the above-described movement of the movable member 55, the gap between the movable member 55 and the wall portion 56b is eliminated.

Thus, in comparison to the time when the pulley 30 and the armature 40 are coupled with each other, the magnetic resistance of the non-attracting magnetic circuit MCb is reduced, and the amount of the magnetic flux, which passes through the non-attracting magnetic circuit MCb, is increased. Thereby, the movable member 55 is maintained in the second position located at the one end side in the axial direction.

Thereafter, the electronic control device 70 stops the output of the clutch OFF signal to the clutch relay 71. Then, the clutch relay 71 opens between the control device 6 and the on-vehicle electric power source Ba.

Here, as shown in FIG. 9(c), when the movable member 55 is placed in the second position, the gap is formed between the movable member 55 and the end surface portion 33 of the pulley 30. Due to the presence of this gap, the magnetic resistance of the attracting magnetic circuit MCa is increased in comparison to the time when the pulley 30 and the armature 40 are coupled with each other, so that the magnetic attractive force, which is generated from the attracting magnetic circuit MCa, is reduced. As a result, the repulsive force, which is generated by the leaf spring 45, becomes larger than the magnetic attractive force, which is generated from the attracting magnetic circuit MCa. Thereby, the pulley 30 and the armature 40 are spaced away from each other. That is, the pulley 30 and the armature 40 are decoupled from each other, so that the rotational drive force, which is outputted from the engine 10, is not conducted to the compressor 2.

Next, the electronic control device 70 outputs a clutch ON signal to the clutch relay 71. Then, the clutch relay 71 connects between the control device 6 and the on-vehicle electric power source Ba. In response to this, the timer circuit 62 receives the electric power from the on-vehicle electric power source Ba and starts the control operation for energizing the coil portions 53a, 53b (step S200 in FIG. 8).

At this time, the movable terminal 60c of the switch 60 contacts the stationary terminal 60a, and the movable terminal 61c of the switch 61 contacts the stationary terminal 61b. Therefore, the electric current flows from the on-vehicle electric power source Ba to the coil portions 53a, 53b in a direction B. The direction B is an opposite direction that is opposite from the direction A. At this time, as shown in FIG. 9(d), the electric current flows in the coil portion 53a from the front side to the back side of the plane of FIG. 9(d), and the electric current flows in the coil portion 53b from the front side to the back side of the plane of FIG. 9(d). Thus, the coil portions 53a, 53b generate an electromagnetic force that causes an increase in the amount of the magnetic flux, which passes through the attracting magnetic circuit MCa, and a decrease in the amount of the magnetic flux, which passes through the non-attracting magnetic circuit MCb. In this way, the magnetic attractive force, which is generated by the attracting magnetic circuits MCa, becomes larger than the magnetic attractive force, which is generated by the non-attracting magnetic circuits MCb.

In response to this, the movable member 55 receives a drive force, which is generated by the magnetic force of the attracting magnetic circuit MCa and drives the movable member 55 toward the other end side in the axial direction. Thereby, the movable member 55 is guided by the guide portion 57a of the yoke 57 and is moved from the second position, which is located at the one end side in the axial direction, toward the first position, which is located at the other end side in the axial direction.

Then, when a time period of TA seconds (referred to as a first time period or a first predetermined time) has elapsed since the time of starting the energization of the coil portions 53a, 53b (YES at step S210), it is determined that the movable member 55 has reached the first position located on the side where the end surface portion 33 of the pulley 30 is placed. Then, the timer circuit 62 terminates the energization of the coil portions 53a, 53b by controlling the switches 60, 61 (step S220). At this time, the movable terminal 61c of the switch 61 contacts the stationary terminal 61a instead of the stationary terminal 61b. Therefore, the energization of the coil portions 53a, 53b from the on-vehicle electric power source Ba is terminated.

The gap between the movable member 55 and the end surface portion 33 of the pulley 30 is eliminated through the movement of the movable member 55 discussed above, so that the state shown in FIG. 9(a) is achieved. Thus, in comparison to the time when the pulley 30 and the armature 40 are decoupled from each other, the magnetic resistance of the attracting magnetic circuit MCa is reduced, and the amount of the magnetic flux of the attracting magnetic circuit MCa is increased. Thereby, the magnetic attractive force becomes larger than the repulsive force of the leaf spring 45, so that the pulley 30 and the armature 40 are coupled with each other. That is, the conduction of the rotational drive force from the engine 10 to the compressor 2 is started.

Thereafter, the electronic control device 70 stops the output of the clutch ON signal to the clutch relay 71. Then, the clutch relay 71 opens between the control device 6 and the on-vehicle electric power source Ba.

According to the above-described embodiment, when the clutch relay 71 connects between the control device 6 and the on-vehicle electric power source Ba after the outputting of the clutch OFF signal from the electronic control device 70 to the clutch relay 71, the timer circuit 62 starts the control operation for energizing the coil portions 53a, 53b. Then, when the time period of TB seconds has elapsed since the time of starting the energization of the coil portions 53a, 53b, it is determined that the movable member 55 has reached the second position, which is located on the side where wall portion 56b is placed. Thus, the timer circuit 62 terminates the energization of the coil portions 53a, 53b by controlling the switches 60, 61. Therefore, the energization of the coil portions 53a, 53b can be terminated when the movable member 55 reaches the second position, which is located on the side where wall portion 56b is placed.

In contrast, when the clutch relay 71 connects between the control device 6 and the on-vehicle electric power source Ba after the outputting of the ON signal from the electronic control device 70 to the clutch relay 71, the timer circuit 62 receive the electric power from the on-vehicle electric power source Ba and begins the control operation for energizing the coil portions 53a, 53b. Then, when the time period of TA seconds (the first time period) has elapsed since the time of starting the energization of the coil portions 53a, 53b, the timer circuit 62 determines that the movable member 55 has reached the first position located on the side where the end surface portion 33 of the pulley 30 is placed. Thus, the timer circuit 62 terminates the energization of the coil portions 53a, 53b by controlling the switches 60, 61. Therefore, the energization of the coil portions 53a, 53b can be terminated when the movable member 55 reaches the second position, which is located on the side where wall portion 56b is placed.

As discussed above, the steps of the flowcharts of FIGS. 7 and 8 are executed by the control device 6. FIG. 1(b) is a functional block diagram showing functions of respective circuit arrangements of the control device 6, which execute these steps. A first energization control arrangement (a first energization control means) 310 executes step S100 of FIG. 7 to execute energization of the electromagnetic coil 53 in such a manner that the magnetic force, which is generated from the non-attracting magnetic circuit MCb, becomes larger than the magnetic force, which is generated from the attracting magnetic circuit MCa, and thereby the movable member 55 is displaced from the first position to the second position. A second energization control arrangement (a second energization control means) 320 executes step S200 of FIG. 8 to execute energization of the electromagnetic coil 53 in such a manner that the magnetic force, which is generated from the non-attracting magnetic circuit MCb, becomes smaller than the magnetic force, which is generated from the attracting magnetic circuit MCa, and thereby the movable member 55 is displaced from the second position to the first position. A determining arrangement (a determining means) 330 executes step S110 of FIG. 7 and step S210 of FIG. 8 and determines whether the movable member 55 has reached one of the first position and the second position. More specifically, the determining arrangement 330 include a first determining arrangement (a first determining means) 330a and a second determining arrangement (a second determining means) 330b. The first determining arrangement 330a executes step S110 of FIG. 7 and determines whether the movable member 55 has reached the second position. The second determining arrangement 330b executes step S210 of FIG. 8 and determines whether the movable member 55 has reached the first position. An energization terminating arrangement (an energization terminating means) 340 stops the energization of the electromagnetic coil 53 when the determining arrangement 330 determines that the movable member 55 has reached the one of the first position and the second position. More specifically, the energization terminating arrangement 340 include a first energization terminating arrangement (a first energization terminating means) 340a and a second energization terminating arrangement (a second energization terminating means) 340b. The first energization terminating arrangement 340a executes step S120 of FIG. 7 and terminates the energization of the electromagnetic coil 53 when the determining arrangement 330 determines that the movable member 55 has reached the second position. The second energization terminating arrangement 340b executes step S220 of FIG. 8 and terminates the energization of the electromagnetic coil 53 when the determining arrangement 330 determines that the movable member 55 has reached the first position.

The sensing of the completion of the movement of the movable member 55 is a turning point of the present disclosure relative to the prior art technique in the self-holding clutch of, for example, the Patent Document 1. The sensing of the completion of the movable member 55 advantageously allows the limiting of the electric power consumption at the clutch ON-OFF time and the execution of the reliable clutch operation.

Furthermore, the movable member 55 is strongly held by the permanent magnet 51 after the completion of the movement of the movable member 55. Therefore, the supply of the electric power after the completion of the movement of the movable member 55 will result in the wasteful consumption of the electric power source and the deterioration of the vehicle fuel consumption.

Furthermore, when the energization time period of the coil portions 53a, 53b is lengthened, the heat generation from the coil portions 53a, 53b is increased. At this time, the permanent magnet 51 is held between and contacts the coil portions 53a, 53b. Therefore, the heat generation at the coil portions 53a, 53b directly causes a temperature increase of the permanent magnet 51, and demagnetization phenomenon of the permanent magnet 51 caused by the temperature increase results in a reduction in the holding force of the permanent magnet 51, i.e., a reduction in a clutch transmission torque performance. Therefore, it is desirable that the supply of the electric power at the ON-OFF time is terminated immediately after the completion of the movement of the movable member.

The compressor 2 and the clutch mechanism 20 are placed in the engine room of the vehicle. Therefore, even at the steady operation time, at which the electric power is not used, the coil portions 53a, 53b and the permanent magnet 51 are placed under the temperature environment, which is equivalent to the ambient temperature, and the temperature increase caused by the heat generation from the coil portions 53a, 53b is accompanied. Therefore, the circumstance is disadvantageous for the permanent magnet 51. Thus, it is preferred that the energization period of the coil portions 53a, 53b is reduced as much as possible.

In contrast, in a case where the time period of supplying the electric power to the coil portions 53a, 53b is too short, the reliable movement of the movable member 55 cannot be ensured, thereby possibly causing an erroneous operation of the clutch mechanism 20. Furthermore, when the supply of the electric power is stopped during the middle of the movement of the movable member 55, the movable member 55 may possibly be stopped in the middle of its movement. Then, the magnetic circuit, which magnetically attracts the armature 40, is weakened, and thereby the transmission torque performance is reduced. Thereby, slipping may occur between the armature 40 and the pulley (the rotor) 30 at the clutch coupling surfaces thereof, and this may possibly cause an abnormal wearing of the clutch coupling surfaces, which possibly lead to an increase in the size of the gap between the armature 40 and the pulley 30 at the clutch OFF time to possibly cause deterioration of the clutch operational performance (e.g., an occurrence of a state where the clutch cannot be placed in the ON state). Furthermore, there will be a problem(s) of malfunction/abnormality. For example, the heat generation, which is caused by the slipping between the armature 40 and the pulley (the rotor) 30, may possibly cause melting of a fusible element, which is placed in the inside of the coil portion 53a, 53b and is connected to the coil portion 53a, 53b. The melting of the fusible element forcefully cuts the supply of the electric current to the coil portions 53a, 53b, and thereby the clutch cannot be operated thereafter.

The fusible element is a thermal fuse, which implements a fail-safe function of cutting the electric power upon melting the thermal fuse with the heat generated through the slipping of the friction surfaces at the time of occurrence of, for example, locking of the compressor 2. Therefore, the malfunction of the fail-safe function may occur.

In the present embodiment, the completion of the movement of the movable member 55 is sensed in the above described manner, so that various advantages, such as the electric power saving and the implementation of reliability of the clutch mechanism 20, are achieved.

According to the present embodiment, the completion of the movement of the movable member 55 is sensed based on the time period (the time period of TA seconds or the time period of TB seconds). Therefore, the present embodiment is readily available at the low costs by adding the timer circuit 62 to the control device of the clutch mechanism 20 without a need for a sensing technique that uses, for example, an expensive sensor.

Furthermore, in the case where the movement of the movable member 55 is sensed with, for example, the sensor, when malfunction of the sensor occurs by any chance, the energization cannot be terminated even after the completion of the movement of the movable member 55. Therefore, in such a case, the electric power is always supplied to the clutch mechanism 20 to possibly cause an increase in the electric power consumption, an increase in the resistance of the winding due to the coil temperature increase, and demagnetization phenomenon of the permanent magnet due to the temperature increase of the magnet. Therefore, it is advantageous to use the time as the sensing means in view of the reliability assurance.

The time period of TA seconds and the time period of TB seconds, which are the energization time periods set in the clutch ON/OFF control process at the control device 6 of the present embodiment, may be an identical time period or may be different time periods, which are different from each other. The best value can be designed for each of the time period of TA seconds and the time period of TB seconds through the magnetic circuit design of the movable member 55, and the design of the electromagnetic coil.

Basically, the time, which is required to complete the movement of the movable member 55, can be computed based on the compelling force (the electromagnetic force and the force of the permanent magnet), the frictional force, and the moving stroke of the movable member, which are exerted at the time of moving the movable member 55, or can be checked through experiments. However, in the present embodiment, a time setting method, which is effective to counteract against the characteristic contradictory matter of the clutch mechanism 20 having the above-described structure, will be described.

In the clutch mechanism, which has the structure of the present embodiment, the armature 40 receives the magnetic attractive force of the coil portions 53*a*, 53*b* in addition to the magnetic force of the permanent magnet 51 at the time of changing from the clutch OFF state to the clutch ON state. In contrast, in the prior art clutch mechanism, which does not have the permanent magnet, the armature 40 is magnetically attracted only with the electromagnetic force of the electromagnetic coil.

Thus, the clutch mechanism 20 of the present embodiment is magnetically attracted with the larger force, so that the clutch mechanism 20 collides against and is connected to the pulley (the rotor) 30 with a larger impact force. The contradictory matter will be as follows. That is, the moving speed of the armature 40 is increased at the time of coupling the armature 40. Thus, the armature 40 has a larger kinetic energy in comparison to the prior art type, and this larger kinetic energy is converted to the heat through the slipping at the time of coupling the armature 40 in comparison to the prior art type. Therefore, the abnormal wearing and the abnormal heat generation at the clutch coupling surfaces are generated to cause the reduction of the clutch transmission torque (the demagnetization of the magnet), and the operational deterioration (the increase in the size of the air gap). Therefore, the optimum setting of the energization time period of the coil portions 53*a*, 53*b* can limit the amount of heat generation and the amount of wearing and is thereby effective. That is, in a case where the energization time period after the completion of the coupling of the armature 40 to the pulley (the rotor) 30 is lengthened, a load, which is applied in a direction perpendicular to the slipping direction of the armature 40, is increased (the above-described electromagnetic force+the magnetic force exerted from the permanent magnet). Thereby, the frictional force, which is applied at the time of slipping of the armature 40, is increased, as indicated by F=μN. Thus, this is not desirable. The best time setting may be such that the energization of the coil portions 53*a*, 53*b* is stopped at the time of coupling of the armature 40 to the pulley 30 to cause generation of the frictional force only by the force of the permanent magnet 51, or alternatively the energization time period after the completion of the coupling is minimized. This best time may be obtained through the experiments or may be theoretically obtained based on equation(s) of motion of the armature 40.

Thus, the management of the energization time period of the coil portions 53*a*, 53*b* as an operation completion sensing means of ON-OFF of the clutch mechanism 20 of the present embodiment is very effective in terms of the costs and the reliability assurance.

Furthermore, in the present embodiment, the control device 6 is placed at the wall portion 56*b* of the stator housing 56, as discussed above. Therefore, the control device 6 can be placed without making a change in the vehicle side. Thus, at the time of installing the clutch mechanism to the vehicle, there is ensured the compatibility between the clutch mechanism 20 of the present embodiment and a clutch mechanism(s) of another company.

Second Embodiment

In the first embodiment discussed above, there is discussed the example, in which the control device 6 is installed at the stator housing 56 of the stator 50. In the present embodiment, there will be described another example, in which the control device 6 is installed to the compressor 2.

Figure 10B:
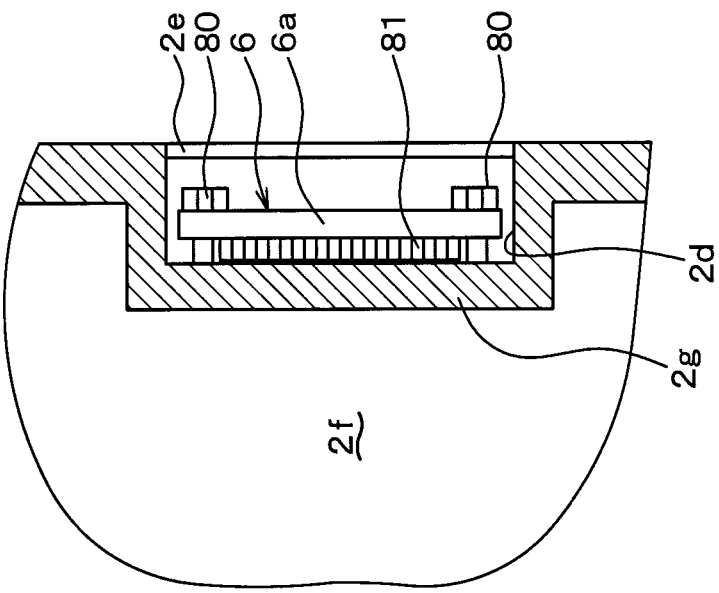
FIG. 10(b) is a partial enlarged view of an area XB in FIG. 10(a).
Figure 10A:
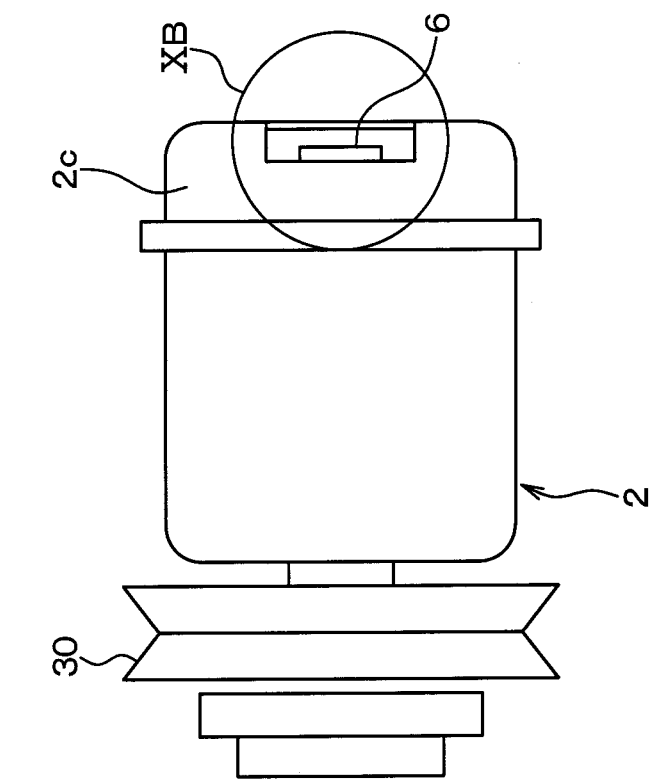
FIG. 10(a) is a view indicating installation of a control device of a clutch mechanism according to a second embodiment of the present disclosure.

FIG. 10(*a*) is a view indicating installation of the control device 6 of the present embodiment. FIG. 10(*b*) is a partial enlarged view of an area XB in FIG. 10(*a*). The control device 6 of the present embodiment is installed at the housing 2*c* of the compressor 2, which is formed from, for example, aluminum. The control device 6 includes an electric circuit board 6*a*, on which various electronic components are installed. The electric circuit board 6*a* is placed in a recess 2*d* of an outer wall of the housing 2*c* of the compressor 2. The electric circuit board 6*a* is fixed to a bottom wall of the recess 2*d* with, for example, screws.

An intake refrigerant chamber 2*f*, into which the refrigerant drawn from the evaporator 5 side is supplied, is formed in the inside of the housing 2*c*, which is located on the inner side of the recess 2*d*. A cover 2*e* is fitted to the recess 2*d* of the housing 2*c*. The cover 2*e* is formed to cover the electric circuit board 6*a* of the recess 2*d*.

Here, it should be noted that a connector, to which an electric power supply harness of the vehicle side is connected, may be directly joined to the electric circuit board 6*a* to connect the electric power supply harness of the vehicle side to the electric circuit board 6*a*. Alternatively, a harness, which is connected to the electric circuit board 6*a*, may be connected to an electric power supply harness of the vehicle side.

Normally, the compressor 2 and the clutch mechanism 20 are installed in the engine room of the vehicle. In such a case, an electric circuit, which is installed to the compressor 2, is also exposed under the high temperature environment. Thus, the electronic components need to have the high heat resistance. In contrast, as shown in FIG. 10(*b*), the electric circuit board 6*a* is placed on the outer wall side of the housing 2*c* of the compressor 2 while a wall portion 2*g* of the housing 2*c* is interposed between the intake refrigerant chamber 2f and the electric circuit board 6a. Thus, depending on the air conditioning operational state, the electric circuit board 6a is cooled with the intake refrigerant, which is, generally, in a temperature range of −5 degrees Celsius to 5 degrees Celsius, so that the reliability of the semiconductor devices of the electric circuit board 6a can be advantageously ensured.

In addition, in the present embodiment, a paste material 81, which has high heat conductivity, is placed between the bottom wall of the housing 2c of the compressor 2 and the electric circuit board 6a. That is, when a gap between the housing 2c and the electric circuit board 6a is filled with the paste material 81, the thermal resistance between the housing 2c and the electric circuit board 6a can be reduced. Thereby, further cooling effect of the electric circuit board 6a can be expected.

Furthermore, in FIG. 10(b), although not depicted in the drawing, a waterproof structure of, for example, an O-ring seal, or a molding structure made of resin may be added to the recess that receives the electric circuit board 6a.

According to the present embodiment, the control device 6 is installed to the housing 2c of the compressor 2. Therefore, at the time of installing the compressor 2 and the clutch mechanism 20 to the vehicle, there is no need to make a change at the vehicle side, and it is only required that an electric power supply harness from the vehicle is connected to the electric circuit board 6a installed to the main body of the compressor 2 like the prior art clutch mechanism. Thus, the compatibility between the clutch mechanism 20 of the present embodiment and the other type of clutch mechanism can be ensured at the time of installation to the vehicle.

In the second embodiment, there is described the example, in which the electric circuit board 6a is installed in the recess 2d of the housing 2c of the compressor 2. Alternatively, the electric circuit board 6a may be received in a circuit case made of resin, and this circuit case may be installed to the housing 2c of the compressor 2.

In such a case, the electric circuit board 6a may be installed to the housing 2c with screws 80 through installation holes of the circuit case. Alternatively, a metal fitting, which is used to mount the circuit case, may be installed to the outer wall of the housing 2c, and the circuit case may be fixed to this metal fitting. However, the mounting method should not be limited to these ones.

Third Embodiment

In the first embodiment, there is described the example where it is determined whether the movable member 55 has reached the first position, which is located on the side where the end surface portion 33 of the pulley 30 is placed, or the second position, which is located on the side where wall portion 56b of the stator housing 56 is placed, based on the preset time period (the time period of TA seconds, or the time period of TB seconds). Alternatively, a sensor may be used to determine whether the movable member 55 has reached the first position or the second position.

Figure 11:
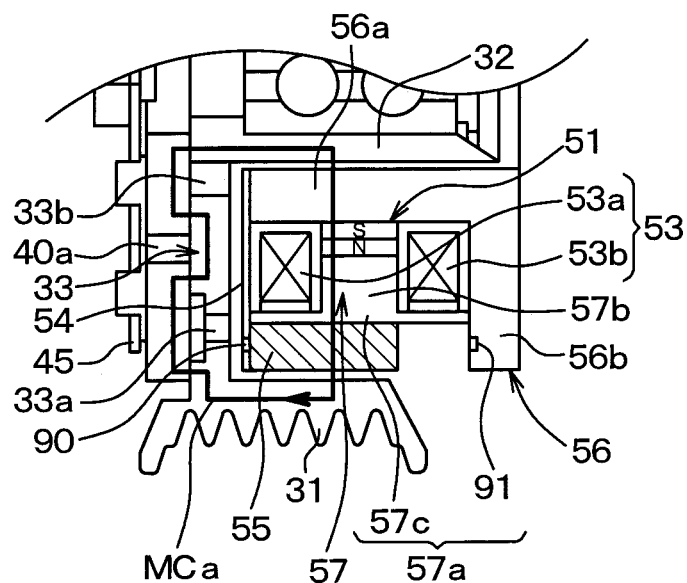
FIG. 11 is a partial cross-sectional view of a clutch mechanism according to a third embodiment of the present disclosure.

FIG. 11 shows the movable member 55 and a peripheral structure around the movable member 55 in the clutch mechanism 20 of the present embodiment.

In the clutch mechanism 20 of the present embodiment, the sensor 90 is placed at the stopper portion 54. The sensor 90 is a sensor that senses the reach of the movable member 55 to the first position, which is located on the side where the end surface portion 33 of the pulley 30 is placed. A sensor 91 is placed at the wall portion 56b of the stator housing 56. The sensor 91 is a sensor that senses the reach of the movable member 55 to the second position, which is located on the side where the wall portion 56b is placed. Each of the sensors 90, 91 is the sensor that senses contact of the movable member 55 to the sensor 90, 91.

In the present embodiment, a switch, which is turned on upon contacting of the movable member 55 to the switch and is turned off upon leaving of the movable member 55 away from the switch, may be used as the sensor 90, 91.

Thereby, the control device 6 (more specifically, the second determining arrangement 330b of the determining arrangement 330) can determine whether the movable member 55 has reached the first position based on an output signal of the sensor 90. The control device 6 (more specifically, the first determining arrangement 330a of the determining arrangement 330) can determine whether the movable member 55 has reached the second position based on an output signal of the sensor 91. The first energization control arrangement 310, the second energization control arrangement 320, the first energization terminating arrangement 340a, and the second energization terminating arrangement 340b of the present embodiment function in a manner similar to that of the first energization control arrangement 310, the second energization control arrangement 320, the first energization terminating arrangement 340a, and the second energization terminating arrangement 340b of the first embodiment.

Fourth Embodiment

In the first and second embodiments, there are described the examples where the energization time period of TA seconds and the energization time period of TB seconds are set by a software. Alternatively, in a fourth embodiment, there will be described an example where the energization time period of TA seconds and the energization time period of TB seconds are set by a time constant that is determined based on a capacitance of a capacitor or a resistance value of a resistor.

Figure 12:
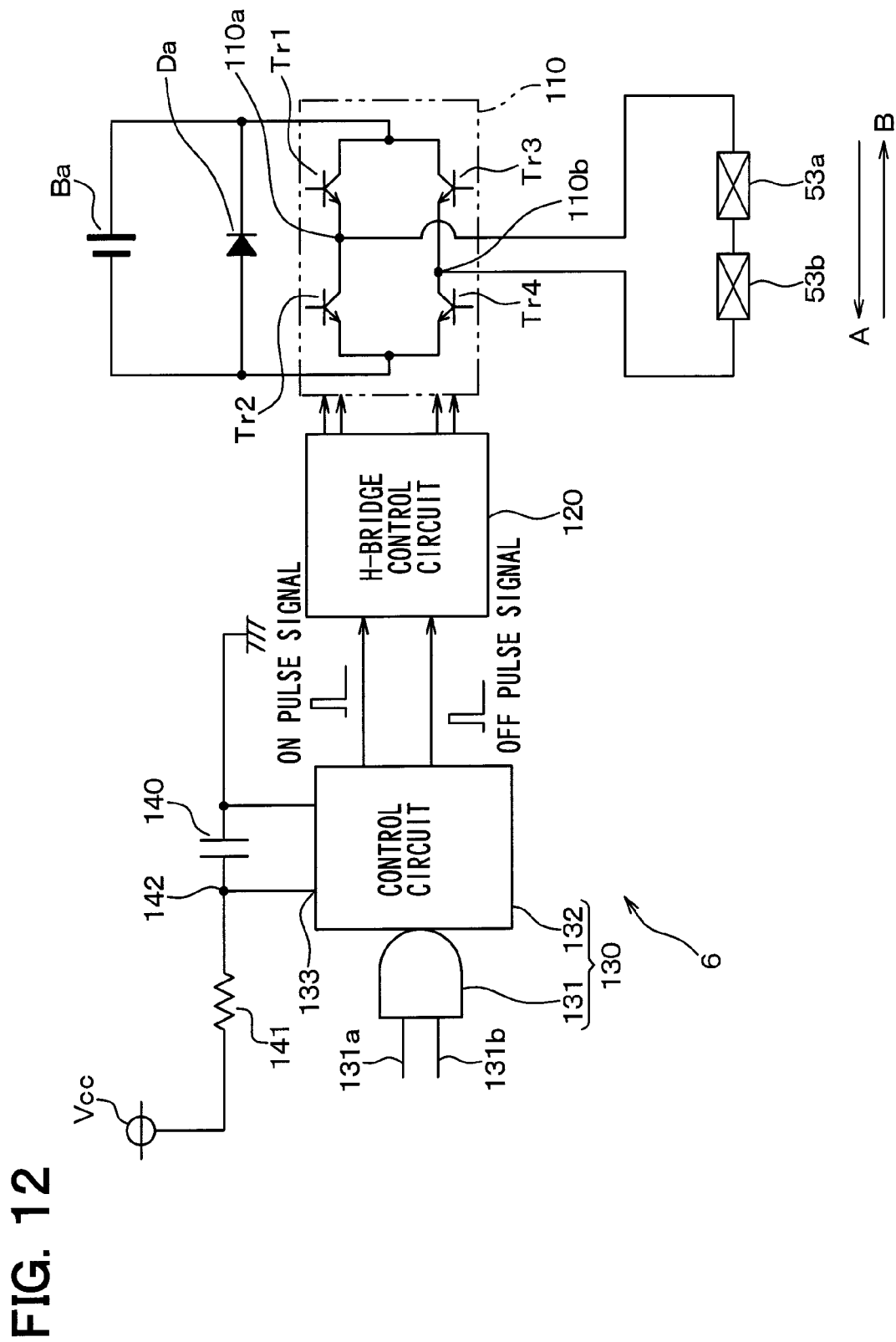
FIG. 12 is an electrical circuit diagram of a clutch mechanism according to a fourth embodiment of the present disclosure.

FIG. 12 indicates an electric circuit structure of the control device 6 according to the present embodiment. The control device 6 includes an H-bridge circuit 110, an H-bridge control circuit 120, an edge sensing circuit 130, a capacitor 140 and a resistor 141.

The H-bridge circuit 110 includes transistors Tr1, Tr2, Tr3, Tr4.

The transistors Tr1, Tr2 are connected one after another in series between a cathode and an anode of the on-vehicle electric power source Ba. The transistors Tr3, Tr4 are connected one after another in series between the cathode and the anode of the on-vehicle electric power source Ba.

The coil portions 53a, 53b are connected one after another in series between a common connection terminal 110a, which is located between the transistors Tr1, Tr2, and a common connection terminal 110b, which is located between the transistors Tr3, Tr4.

The on-vehicle electric power source Ba is an on-vehicle electric power source that supplies the electric power to the coil portions 53a, 53b. A diode Da is connected between the cathode and the anode of the on-vehicle electric power source Ba.

The H-bridge control circuit 120 controls the transistors Tr1, Tr2, Tr3, Tr4 based on an ON pulse signal and an OFF pulse signal outputted from the edge sensing circuit 130.

In the present embodiment, a known integrated circuit is used as the H-bridge control circuit 120. For example, an integrated circuit (part number: R2J25953) manufactured by Renesas Electronics Corporation is used as the H-bridge control circuit 120. The edge sensing circuit 130 includes an input circuit 131 and a control circuit 132.

The input circuit 131 includes an AND gate that has input terminals 131a, 131b. Control signals of the electronic control device 70 are inputted to the input terminals 131a, 131b.

The control circuit 132 outputs the ON-pulse signal or the OFF-pulse signal to the H-bridge control circuit based on the output signals of the input circuit 131 and an output voltage of a common connection terminal 142.

The common connection terminal 142 is a common connection terminal between the capacitor 140 and the resistor 141. The common connection terminal 142 is connected to a control input terminal 133 of the control circuit 132.

The capacitor 140 is connected between a cathode and an anode of an on-vehicle electric power source Vcc. The resistor 141 is connected between the cathode and the capacitor 140 of the on-vehicle electric power source Vcc. The on-vehicle electric power source Vcc is an electric power source that supplies an electric power to the electric circuit.

An integrated circuit (a part number TC74HC221AF) manufactured by Toshiba Corporation is used as the edge sensing circuit 130 of the present embodiment.

Next, an operation according to the present embodiment will be described with reference to FIG. 13.

First of all, the electronic control device 70 outputs a high level signal as the clutch ON signal to the input terminals 131a, 131b of the input circuit 131.

Figure 13:
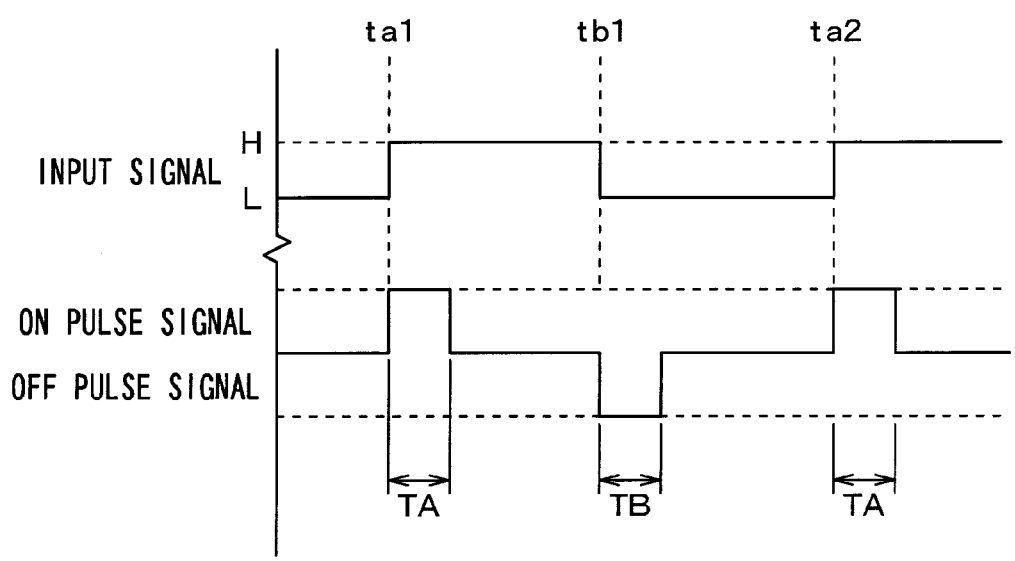
FIG. 13 is a timing diagram showing an operation of an edge sensing circuit of FIG. 12.

At this time, the level of the input signal, which is inputted from the input circuit 131 to the control circuit 132, is changed from the low level to the high level (see the input signal at the timing ta1 in FIG. 13).

In response to this, the control circuit 132 outputs the ON pulse signal (see the ON pulse signal in FIG. 13) to the H-bridge control circuit 120 according to the voltage, which is applied from the common connection terminal 142 to the control input terminal 133. The ON pulse signal is a pulse signal that becomes the high level throughout the time period TA. The control circuit 132 sets the time period TA according to a time constant that is defined by a capacitance of the capacitor 140 and a resistance value of the resistor 141.

When the ON signal is inputted to the H-bridge control circuit 120, the H-bridge control circuit 120 turns on the transistors Tr1, Tr4 and turns off the transistors Tr2, Tr3 and maintains this state throughout the time period TA.

That is, the H-bridge control circuit 120 maintains the state, in which the H-bridge control circuit 120 turns on the transistors Tr1, Tr4 and turns off the transistors Tr2, Tr3, throughout the time period TA, throughout which the ON pulse signal is inputted to the H-bridge control circuit 120. Thus, the electric current flows from the on-vehicle electric power source Ba to the coil portions 53a, 53b through the transistors Tr1, Tr4 in the direction B. The direction B is an opposite direction that is opposite from the direction A.

At this time, as shown in FIG. 9(d), the electric current flows in the coil portion 53a from the front side to the back side of the plane of FIG. 9(d), and the electric current flows in the coil portion 53b from the front side to the back side of the plane of FIG. 9(d). Thus, the coil portions 53a, 53b generate an electromagnetic force that causes an increase in the amount of the magnetic flux, which passes through the attracting magnetic circuit MCa, and a decrease in the amount of the magnetic flux, which passes through the non-attracting magnetic circuit MCb. In this way, the magnetic attractive force, which is generated by the attracting magnetic circuits MCa, becomes larger than the magnetic attractive force, which is generated by the non-attracting magnetic circuits MCb.

In response to this, the movable member 55 receives a drive force, which is generated by the magnetic force of the attracting magnetic circuit MCa and drives the movable member 55 toward the other end side in the axial direction. Thereby, the movable member 55 is guided by the guide portion 57a of the yoke 57 and is moved from the second position, which is located at the one end side in the axial direction, toward the first position, which is located at the other end side in the axial direction.

Thereafter, when the time period of TA seconds (the first time period) elapses since the time of starting the energization of the coil portions 53a, 53b, the control circuit 132 determines that the movable member 55 has reached the first position and thereby stops the output of the ON pulse signal to the H-bridge control circuit 120. Thus, the H-bridge control circuit 120 turns off each of the transistors Tr1, Tr2, Tr3, Tr4. Thereby, the energization of coil portions 53a, 53b is terminated. As a result, the movable member 55 stops at the first position.

Next, the electronic control device 70 outputs a low level signal to the input terminals 131a, 131b of the input circuit 131 as the clutch OFF signal.

At this time, the level of the input signal, which is inputted from the input circuit 131 to the control circuit 132, is changed from the high level to the low level (see the input signal at the timing tb1 in FIG. 13). In response to this, the control circuit 132 outputs the OFF pulse signal (see the OFF pulse signal in FIG. 13) to the H-bridge control circuit 120 according to the voltage, which is applied from the common connection terminal 142 to the control input terminal 133. The OFF pulse signal is a pulse signal that becomes the high level throughout the time period TB. The control circuit 132 sets the time period TB according to the time constant that is defined by the capacitance of the capacitor 140 and the resistance value of the resistor 141. In the present embodiment, the time period TB and the time period TA are set to be an identical time period. It should be noted that the time period TB and the time period TA may be set to be different time periods, respectively, which are different from each other.

When the OFF signal is inputted to the H-bridge control circuit 120, the H-bridge control circuit 120 turns off the transistors Tr1, Tr4 and turns on the transistors Tr2, Tr3 and maintains this state throughout the time period TB.

That is, the H-bridge control circuit 120 maintains the state, in which the H-bridge control circuit 120 turns off the transistors Tr1, Tr4 and turns on the transistors Tr2, Tr3, throughout the time period TA, throughout which the OFF pulse signal is inputted to the H-bridge control circuit 120. Thus, the electric current flows from the on-vehicle electric power source Ba to the coil portions 53a, 53b through the transistors Tr2, Tr3 in the direction A.

At this time, similar to the first embodiment, the electric current flows in the coil portion 53a from the back side to the front side of the plane of FIG. 9(b), and the electric current flows in the coil portion 53b from the back side to the front side of the plane of FIG. 9(b). Thus, the coil portions 53a, 53b reduce the amount of the magnetic flux, which passes through the attracting magnetic circuit MCa and increases the amount of the magnetic flux, which passes through the non-attracting magnetic circuit MCb.

In this way, the magnetic force, which is generated by the non-attracting magnetic circuit MCb indicated with the bold dotted line in FIG. 9(b), becomes larger than the magnetic attractive force, which is generated by the attracting magnetic circuit MCa indicated with the thin solid line in FIG. 9(b).

In response to this, a drive force, which is generated by the magnetic force of the non-attracting magnetic circuit MCb and drives the movable member 55 toward the one end side in the axial direction, is exerted to the movable member 55. Thus, the movable member 55 is guided by the guide portion 57a of the yoke 57 and is moved from the first position at the other end side in the axial direction toward the second position at the one end side in the axial direction.

Thereafter, when the time period of TB seconds (the second time period) elapses since the time of starting the energization of the coil portions 53a, 53b, the control circuit 132 determines that the movable member 55 has reached the second position and thereby stops the output of the OFF pulse signal to the H-bridge control circuit 120. Thus, the H-bridge control circuit 120 turns off each of the transistors Tr1, Tr2, Tr3, Tr4. Thereby, the energization of coil portions 53a, 53b is terminated. As a result, the movable member 55 stops at the second position.

According to the present embodiment, similar to the first embodiment, the completion of the movement of the movable member 55 is sensed based on the time period (the time period of TA second, or the time period of TB seconds). Therefore, the present embodiment is readily available at the low costs by adding the edge sensing circuit 130 to the clutch control device of the clutch mechanism 20 without a need for a sensing technique that uses, for example, an expensive sensor.

In the present embodiment, the edge sensing circuit 130 sets the energization time period of TA seconds and the energization time period of TB seconds based on the time constant that is defined by the capacitance of the capacitor 140 and the resistance value of the resistor 141. Thus, the setting of the energization time period can be implemented with the simple circuit structure, such as the edge sensing circuit 130. Thereby, the setting of the energization time period can be implemented at the low costs.

OTHER EMBODIMENTS

In the first to fourth embodiments, there are described the examples, in which the guide portion 57a is formed in the yoke 57. However, the present disclosure is not limited to this configuration. For example, the clutch mechanism 20 may be constructed by eliminating the guide portion 57a from the yoke 57.

In the fourth embodiment, there is described the example where the energization time period of TA seconds and the energization time period of TB seconds are set as the identical time period. Alternatively, the energization time period of TA seconds and the energization time period of TB seconds may be set to be different time periods, respectively, which are different from each other.

In the first to fourth embodiments, there are described the examples where the coil portions 53a, 53b are connected in series. Alternatively, the coil portions 53a, 53b may be connected in parallel.

In the first to fourth embodiments, there are described the examples where the control device 6, which forms the energization terminating arrangement 340, the first energization control arrangement 310, the second energization control arrangement 320 and the determining arrangement 330, is formed separately from the electronic control device 70. However, the present disclosure is not limited to this configuration. For example, the energization terminating arrangement 340, the first energization control arrangement 310, the second energization control arrangement 320, and the determining arrangement 330 may be formed by the electronic control device 70 of the air conditioning system, as indicated by reference numeral 70 in FIG. 1(b).

Here, the electronic control device 70 of the air conditioning system is placed in the vehicle cabin, as discussed above. Therefore, the environment, such as the ambient temperature around the electronic control device 70, can be kept as a good environment. Thus, the cooling of the electronic control device 70 can be appropriately performed.

Furthermore, the energization terminating arrangement 340, the first energization control arrangement 310, the second energization control arrangement 320, and the determining arrangement 330 may be formed by another electronic control device (an on-vehicle electronic control device), which is other than the electronic control device 70 of the air conditioning system.

In such a case, it is desirable that the energization terminating arrangement 340, the first energization control arrangement 310, the second energization control arrangement 320, and the determining arrangement 330 are formed by an electronic control device that is installed in the vehicle cabin.

In the first to fourth embodiments, the first determining arrangement 330a, which determines whether the time period TB has elapsed at the time of turning off of the clutch mechanism 20, and the second determining arrangement 330b, which determines whether the time period TA has been elapsed at the time of turning on of the clutch mechanism 20, are provided. Alternatively, only one of the first determining arrangement 330a and the second determining arrangement 330b may be provided.

The present disclosure is not limited to the above embodiments, and the above embodiments may be modified in various ways within the scope of the present disclosure recited in the claims. The above-described features of the first to fourth embodiments may be combined in various ways unless such a combination is obviously impossible. Furthermore, in the first to fourth embodiments, it should be understood that the features of the embodiments are not necessarily indispensable except a case where the features are expressly stated as indispensable and a case where the features are regarded as indispensable in view of the principle.

What is claimed is:
1. A clutch mechanism comprising:
a driving-side rotatable body that is rotated by a rotational drive force, which is outputted from a drive source;
a driven-side rotatable body, to which the rotational drive force is transmitted from the driving-side rotatable body through coupling of the driven-side rotatable body to the driving-side rotatable body;
a permanent magnet that generates an attracting magnetic circuit, which generates a magnetic force for coupling between the driving-side rotatable body and the driven-side rotatable body, and a non-attracting magnetic circuit, which is different from the attracting magnetic circuit;
a movable member that is made of a magnetic material and is displaceable; and
an electromagnetic coil that generates an electromagnetic force for displacing the movable member, wherein:

when the driving-side rotatable body and the driven-side rotatable body are coupled with each other, the movable member is placed in a first position, at which a magnetic resistance of the attracting magnetic circuit is reduced in comparison to a magnetic resistance of the attracting magnetic circuit at a time of decoupling between the driving-side rotatable body and the driven-side rotatable body; and when the driving-side rotatable body and the driven-side rotatable body are decoupled from each other, the movable member is placed in a second position, at which a magnetic resistance of the non-attracting magnetic circuit is reduced in comparison to a magnetic resistance of the non-attracting magnetic circuit at a time of coupling between the driving-side rotatable body and the driven-side rotatable body;

a first energization control arrangement that executes energization of the electromagnetic coil in such a manner that a magnetic force, which is generated from the non-attracting magnetic circuit, becomes larger than the magnetic force, which is generated from the attracting magnetic circuit, and thereby the movable member is displaced from the first position to the second position;

a second energization control arrangement that executes energization of the electromagnetic coil in such a manner that the magnetic force, which is generated from the non-attracting magnetic circuit, becomes smaller than the magnetic force, which is generated from the attracting magnetic circuit, and thereby the movable member is displaced from the second position to the first position;

a determining arrangement that determines whether the movable member has reached one of the first position and the second position; and an energization terminating arrangement that stops the energization of the electromagnetic coil when the determining arrangement determines that the movable member has reached the one of the first position and the second position.

2. The clutch mechanism according to claim 1, wherein:
the energization terminating arrangement includes:
a first energization terminating arrangement that stops the energization of the electromagnetic coil when the determining arrangement determines that the movable member has reached the second position; and
a second energization terminating arrangement that stops the energization of the electromagnetic coil when the determining arrangement determines that the movable member has reached the first position.

3. The clutch mechanism according to claim 2, wherein:
when a first time period elapses from a time of starting the energization of the electromagnetic coil by the first energization control arrangement, the determining arrangement determines that the movable member has reached the second position; and
when a second time period elapses from a time of starting the energization of the electromagnetic coil by the second energization control arrangement, the determining arrangement determines that the movable member has reached the first position.

4. The clutch mechanism according to claim 3, comprising:
a capacitor that is connected between an electric power source and a ground; and
a resistor element that is connected between the electric power source and the capacitor, wherein the first time period and the second time period are set by a time constant, which is determined by a capacitance of the capacitor and a resistance value of the resistor element.

5. The clutch mechanism according to claim 1, wherein:
the energization terminating arrangement, the first energization control arrangement, the second energization control arrangement, and the determining arrangement are formed by a control device;
the clutch mechanism comprises a stator that is fixed to a housing, which rotatably supports the driven-side rotatable body, wherein the attracting magnetic circuit and the non-attracting magnetic circuit are formed by the stator; and
the control device is placed at the stator.

6. The clutch mechanism according to claim 1, wherein:
the energization terminating arrangement, the first energization control arrangement, the second energization control arrangement, and the determining arrangement are formed by a control device;
a housing, which rotatably supports the driven-side rotatable body, receives a compression mechanism, which draws, compresses and discharges refrigerant with a rotational force of the driven-side rotatable body, to form a compressor; and
the control device is placed at the compressor.

7. The clutch mechanism according to claim 6, wherein the control device is placed at an outer wall of the housing and is cooled by the refrigerant, which is drawn into the housing, through operation of the compression mechanism.

8. The clutch mechanism according to claim 1, wherein the energization terminating arrangement, the first energization control arrangement, the second energization control arrangement, and the determining arrangement forms an on-vehicle electronic control device, which is installed in a vehicle cabin.

* * * * *